United States Patent [19]
Kanamori

[11] Patent Number: 5,953,450
[45] Date of Patent: Sep. 14, 1999

[54] IMAGE FORMING APPARATUS CORRECTING THE DENSITY OF IMAGE INFORMATION ACCORDING TO THE TYPE OF MANUSCRIPT

[75] Inventor: Keiko Kanamori, Kawasaki, Japan

[73] Assignee: Kabushiki Kaisha Toshiba, Kawasaki, Japan

[21] Appl. No.: 09/129,869

[22] Filed: Aug. 6, 1998

Related U.S. Application Data

[63] Continuation of application No. 08/594,400, Jan. 31, 1996.

[30] Foreign Application Priority Data

Jan. 31, 1995 [JP] Japan .................................. 7-013736

[51] Int. Cl.$^6$ ...................................................... H04N 1/38
[52] U.S. Cl. .......................... 382/171; 382/273; 358/462
[58] Field of Search ..................................... 382/171, 273, 382/168–170, 172, 270–272; 358/460–462

[56] References Cited

U.S. PATENT DOCUMENTS

| | | | |
|---|---|---|---|
| 4,411,015 | 10/1983 | Scheri et al. | 382/51 |
| 4,903,145 | 2/1990 | Funada | 358/460 |
| 5,034,991 | 7/1991 | Hagimae et al. | 382/171 |
| 5,280,367 | 1/1994 | Zuniga | 382/171 |
| 5,848,182 | 12/1998 | Kanamori | 382/171 |

FOREIGN PATENT DOCUMENTS

| | | |
|---|---|---|
| 64-6588 | 2/1989 | Japan . |
| 3-30143 | 4/1991 | Japan . |

*Primary Examiner*—Thomas D. Lee
*Assistant Examiner*—Stephen Brinich
*Attorney, Agent, or Firm*—Foley & Lardner

[57] ABSTRACT

An image forming apparatus, which converts the analog image read in lines into a digital image containing the density information in pixels, comprises a histogram creating circuit that converts the density information on the target pixels in the digital image into multiple values and creates a histogram having the frequency for each density, a peak density value determining circuit that determines the peak density values of two points at which the frequency of the density histogram peaks, a computing circuit that computes a reference value for density correction of the digital image on the basis of the frequency of the peak density value, a circuit that judges the type of the image on the basis of the features of the density histogram, a circuit that corrects the reference value on the basis of the judged type of the image, and a circuit that corrects the density information about the digital image on the basis of the corrected reference value.

9 Claims, 18 Drawing Sheets

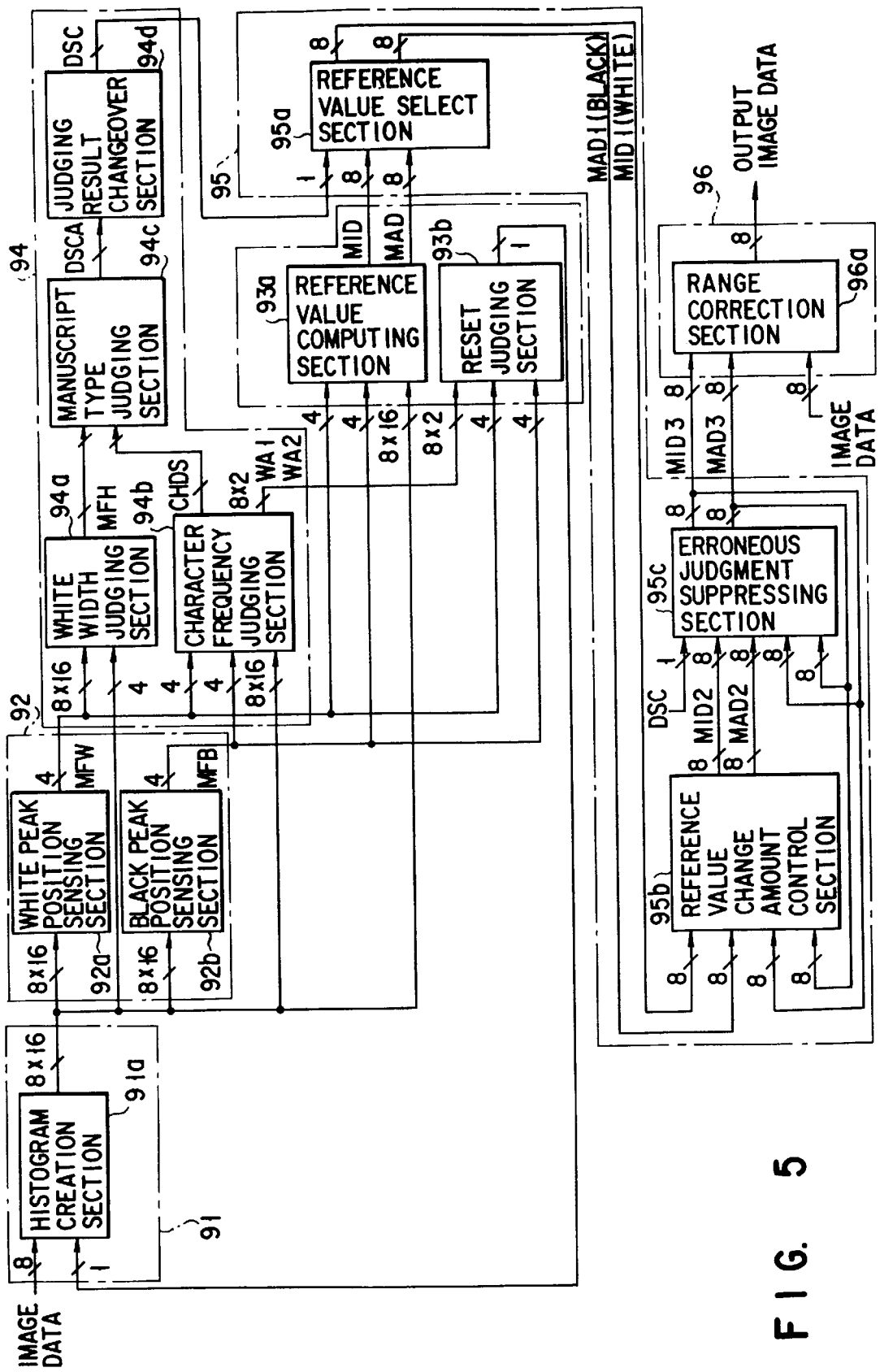
F I G. 5

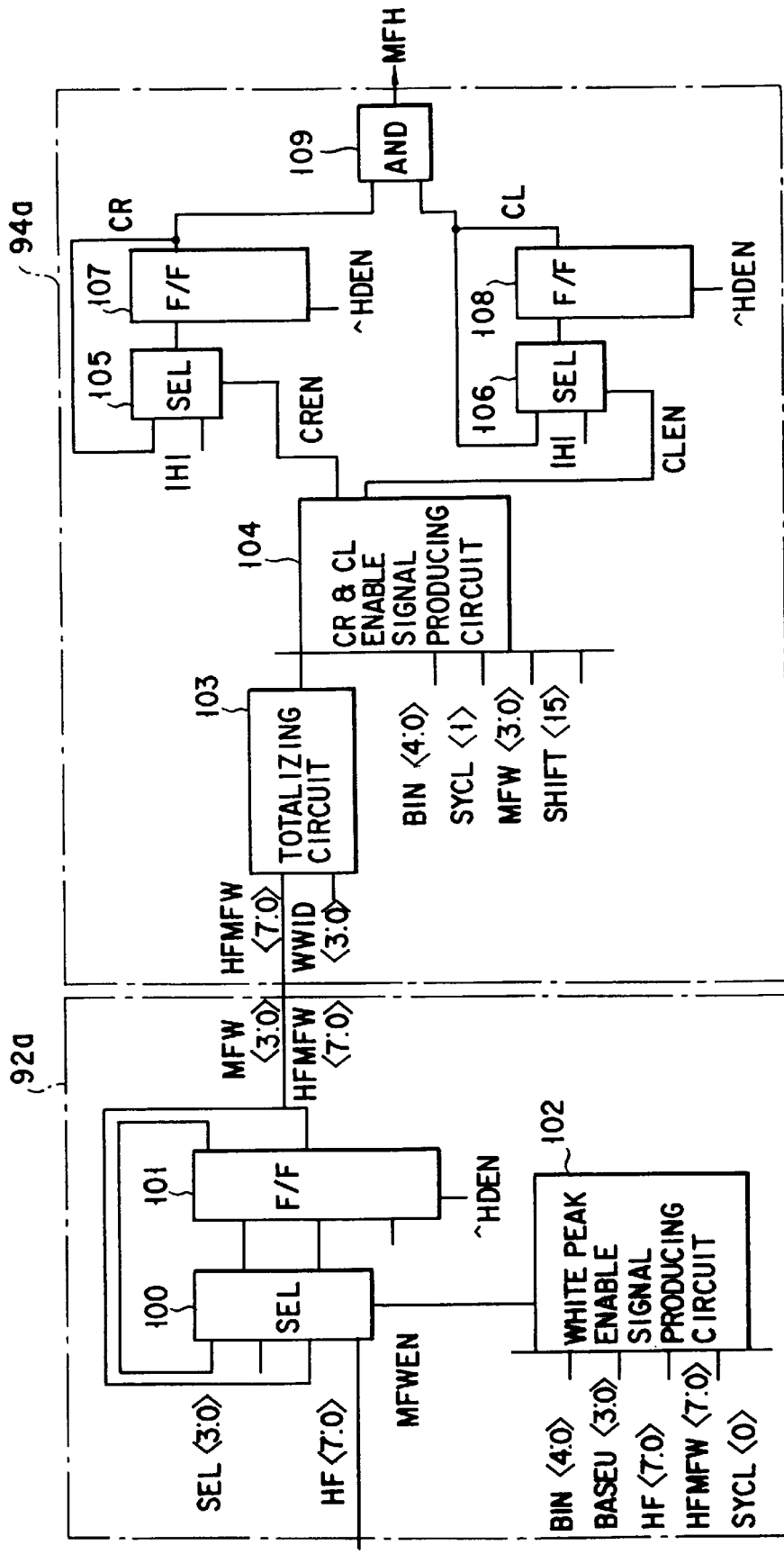
F I G. 6

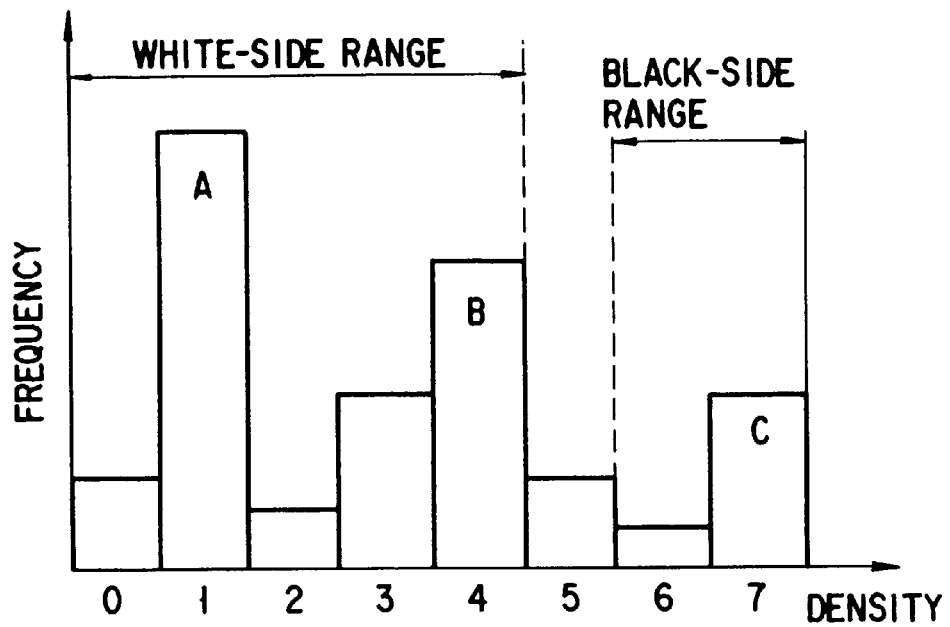
F I G. 16
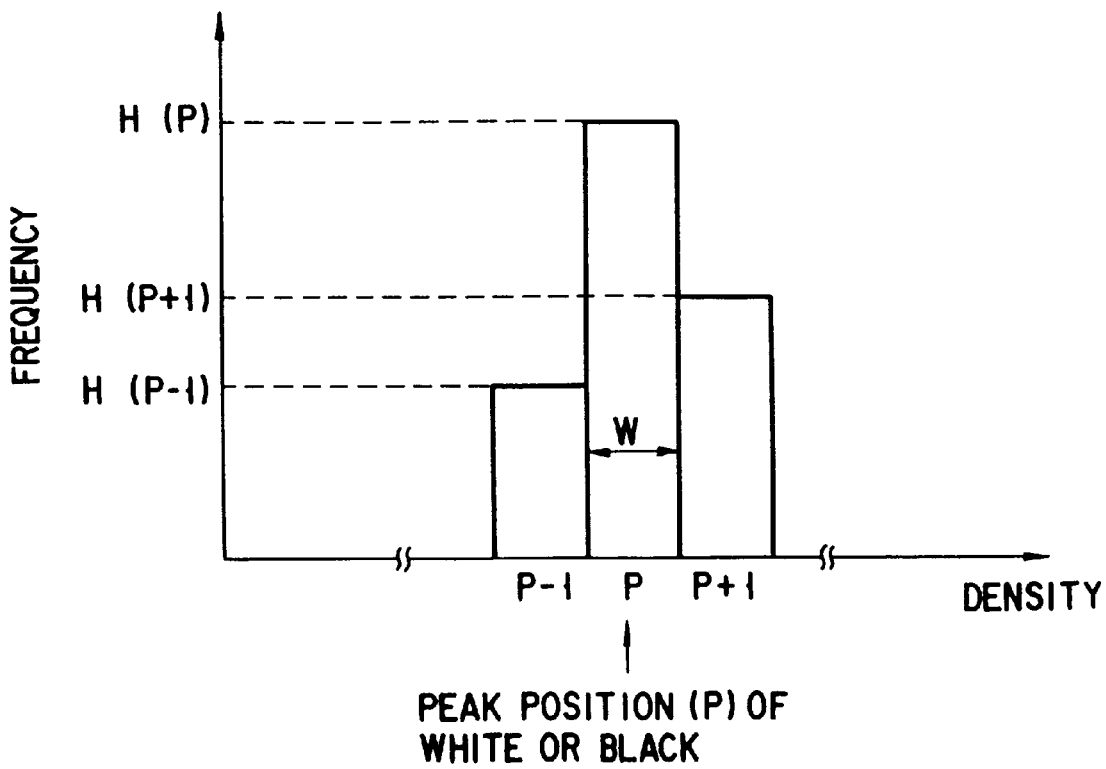
F I G. 17

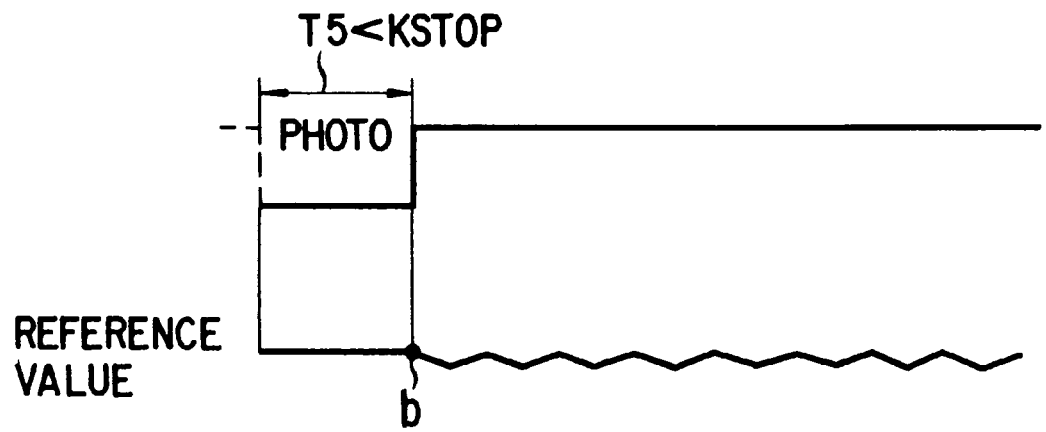
F I G. 21A
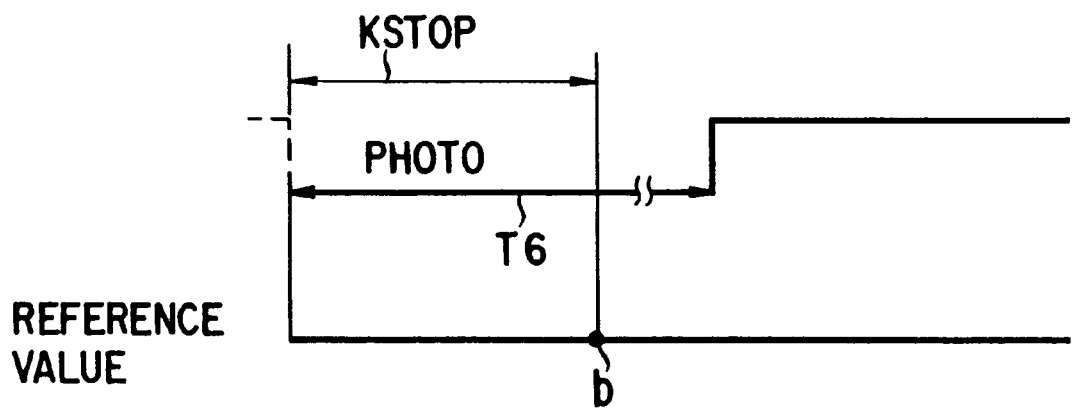
F I G. 21B

IMAGE FORMING APPARATUS CORRECTING THE DENSITY OF IMAGE INFORMATION ACCORDING TO THE TYPE OF MANUSCRIPT

This application is a continuation of application Ser. No. 08/594,400, filed Jan. 31, 1996.

BACKGROUND OF THE INVENTION

1. Field of the Invention

This invention relates to an image forming apparatus, such as a digital copying machine, which determines a reference value used for gradation correction from a density histogram of an image, when performing gradation correction on the target image, and carries out the gradation correction using the reference value.

2. Description of the Related Art

Besides conventional analog image forming apparatuses, such as electronic copying machines, digital image forming apparatuses have recently been popularized. In this connection, to realize an automatic exposure function generally found with the analog copying machines, that is, the function of obtaining the optimum picture quality by sensing the manuscript density with a sensor and on the basis of the sensed density, changing the brightness of the exposure lamp, automatic density adjustment using a density histogram has been proposed as described in Jpn. Pat. Appln. KOKOKU Publication No. 64-6588 and Jpn. Pat. Appln. KOKOKU Publication No. 3-30143.

When a reference value for gradation correction is computed from the density histogram of the target image, however, the reference value computed changes, depending on whether the target image is a photograph or character, or with the change of the density distribution in the density histogram. This causes the problem that error correction is unstable in forming an image of a manuscript having photograph areas and character areas intermingled or an image whose density changes greatly.

SUMMARY OF THE INVENTION

The object of the present invention is to provide an image forming apparatus capable of performing an optimum gradation correction on the basis of a reference value for gradation correction obtained from a density histogram of a target image.

The foregoing object is accomplished by providing an image forming apparatus which reads an image in lines containing the density information on each pixel with converting means, the image forming apparatus comprising: means for a density histogram having the frequency of each density; means for determining a peak density value at which the frequency of the density histogram peaks; means for computing a reference value for density correction of the digital image on the basis of the frequency of the peak density value; means for judging the type of the image on the basis of the features of the density histogram; means for correcting the reference value on the basis of the judged type of the image; and means for correcting the density information about the digital image on the basis of the reference value corrected at the correcting means.

With the above configuration of the invention, because a density histogram is obtained and on the basis of the histogram, the reference value for density correction is determined, it is possible to provide an image forming apparatus which is capable of performing stable density correction on the basis of the reference value according to the density, even when the density distribution varies from one place to another on the image. Furthermore, on the basis of the density histogram, the type of image (e.g., character or photograph) is judged and according to the type, the reference value for density correction is adjusted each time the type is judged, so that it is possible to provide an image forming apparatus capable of making natural density adjustment even when an image of a manuscript having photographs and character intermingled is formed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a block diagram of the processing sections corresponding to the respective means constituting the range correction circuit;

FIG. 6 is a circuit diagram of the white peak position sensing section and the white width judging section;

FIG. 16 is a histogram with three peaks and the number of values given to the input image signal being 8;

FIG. 17 shows the peak position of the histogram and the frequency of local peaks on the right and left sides;

FIGS. 20A to 20D and FIGS. 21A and 21B are timing charts explaining the operation of judgment correction in the present invention.

DETAILED DESCRIPTION OF THE PREFERRED EMBODIMENTS

Hereinafter, referring to the accompanying drawings, an embodiment of the present invention will be explained.

Figure 2:
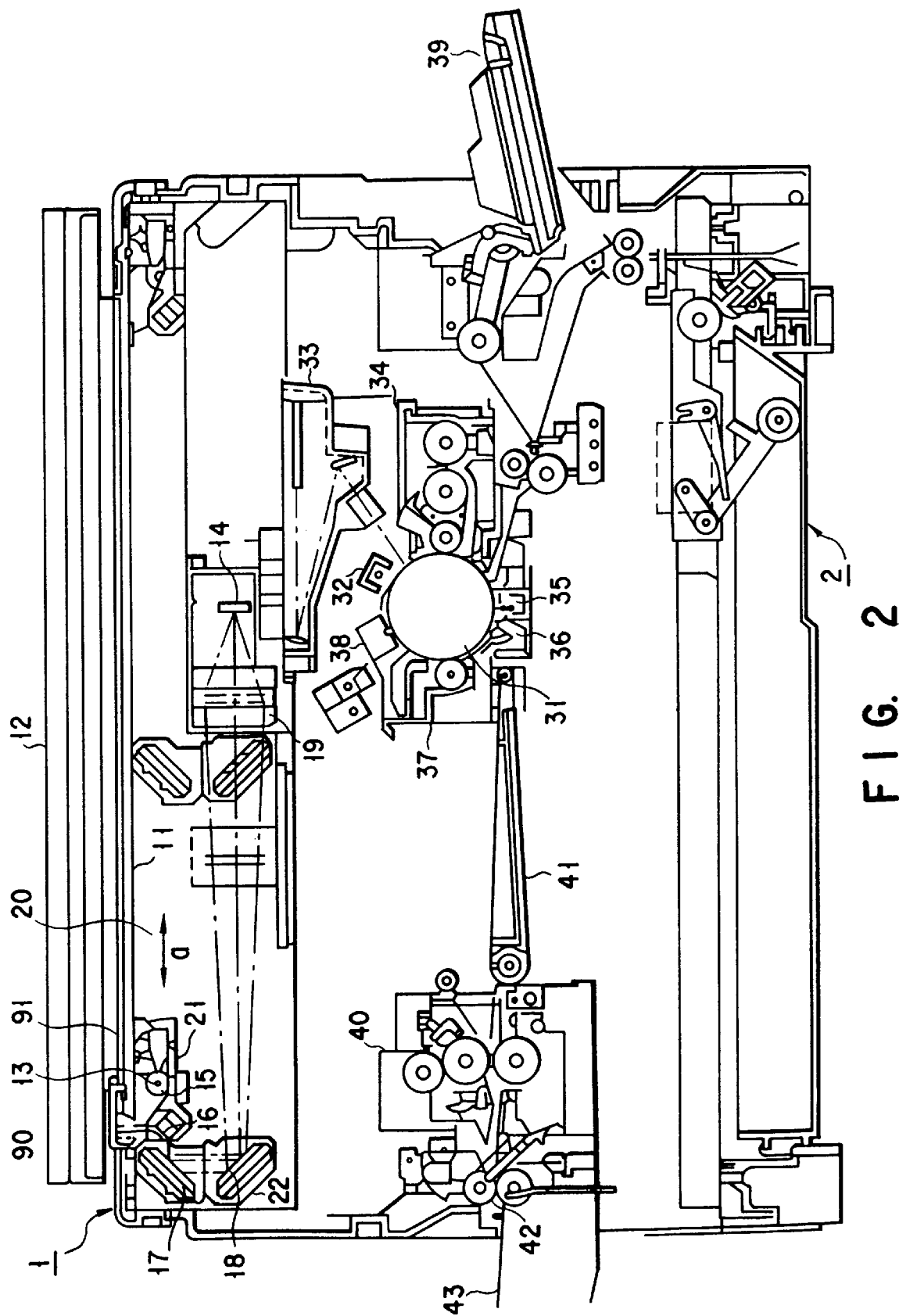
FIG. 2 is a schematic sectional view of the image forming apparatus according to the present invention.

FIG. 2 shows a schematic configuration of a digital copying machine as an example of an image forming apparatus according to the invention. The digital copying machine is largely composed of a scanner section 1 acting as reading means for optically reading the image information on a manuscript, and a printer section 2 acting as image forming means for forming an image on paper by electronic photography according to the image signal supplied from the scanner section 1 or from an external device (not shown).

The scanner section 1 contains a manuscript table 11 on which a manuscript to be copied is put, a manuscript cover 12 that can be opened and closed freely and is used to hold down the manuscript placed on the manuscript table 11, a fluorescent lamp 13 serving as a light source illuminating the manuscript on the manuscript table 11, and a CCD line sensor 14 serving as photoelectric conversion means for photoelectrically converting the reflected light from the manuscript on which light is projected from the fluorescent lamp 13. The fluorescent lamp 13 is provided with a lamp heater (not shown) acting as heating means for heating the lamp's tube wall to a constant temperature. The manuscript table 11 is provided with a manuscript glass 91 on which a manuscript is placed and a manuscript scale 90 against which a manuscript is pressed to measure the position of the manuscript.

Provided on one side of the fluorescent lamp 13 is a reflector 15 for causing the light from the fluorescent lamp 13 to concentrate efficiently on the manuscript. Between the fluorescent lamp 13 and the line sensor 14, there are provided a plurality of mirrors 16, 17, and 18 for bending the optical path through which the reflected light from the manuscript passes, and a lens unit 19 for forcing the reflected light to focus on the light-receiving face of the line sensor 14.

By reciprocating motion of the scanning system composed of the fluorescent lamp 13 and mirrors 16 to 18 along the bottom surface of the manuscript table 11 in the direction of arrow "a", the manuscript on the manuscript table 11 undergoes exposure scanning. In this case, the mirrors 17, 18 are designed to move at half the speed of the mirror 16 to maintain the optical path length.

The reflected light from the manuscript by scanning of the scanning system, that is, the reflected light from the manuscript by illumination of the fluorescent lamp 13, is reflected by the mirrors 16 to 18, and then passes through the lens unit 19, is directed to the line sensor 14, where an image of the manuscript is formed on the light-receiving face of the line sensor 14.

The scanning unit 20 is composed of the fluorescent lamp 13, line sensor 14, mirrors 16 to 18, and lens unit 19. The fluorescent lamp 13, reflector 15 and mirror 16 are provided on a first carriage 21, whereas the mirrors 17, 18 are provided on a second carriage 22. Each of these carriages 21, 22 is moved by a motor (not shown).

The printer section 2 is cylindrical. It is designed to be capable of being rotated by, for example, a motor (not shown) in the desired direction to be charged to the desired potential. It also contains a photosensitive drum 31 serving as an image retaining member on which an electrostatic latent image is formed as a result of the beam light modulated according to the print data being projected on the drum.

Around the photosensitive drum 31, there are provided a charging unit 32 for charging the surface of the photosensitive drum 31, a laser unit 33 for projecting a beam light on the surface of the photosensitive drum 31, the beam light being modulated according to the print data (the image information to be copied or outputted), a developing unit 34 for developing the electrostatic latent image formed on the photosensitive drum 31 by the beam light from the laser unit 33 by causing toner to adhere to the latent image, a transfer unit 35 for transferring the developed toner image on the photosensitive drum 31 onto a sheet of paper supplied from a paper feed section 39 explained later, and an exfoliating unit 36 for exfoliating the sheet adhering to the photosensitive drum 31.

Around the photosensitive drum 31 and on the downstream side of the exfoliating unit 36, there are a cleaner unit 37 for removing the remaining toner on the surface of the photosensitive drum 31 and an erasing unit 38 for erasing the potential on the photosensitive drum 31 for a subsequent image.

Provided between the developing unit 34 and the transfer unit 35 is a paper feed section 39 for feeding sheets of paper to which the toner image formed on the photosensitive drum 31 is to be transferred toward between the photosensitive drum 31 and the transfer unit 35.

In the stage next to the exfoliating unit 36 on the side toward which the toner-image-transferred sheet is peeled by the exfoliating unit 36 from the photosensitive drum 31, there is provided a transport unit 41 that carries the exfoliated sheet of paper to a fixing unit 40.

The sheet to which the toner image has been fixed at the fixing unit 40 is discharged by a discharge roller 42 to a discharge tray 43.

Figure 3:
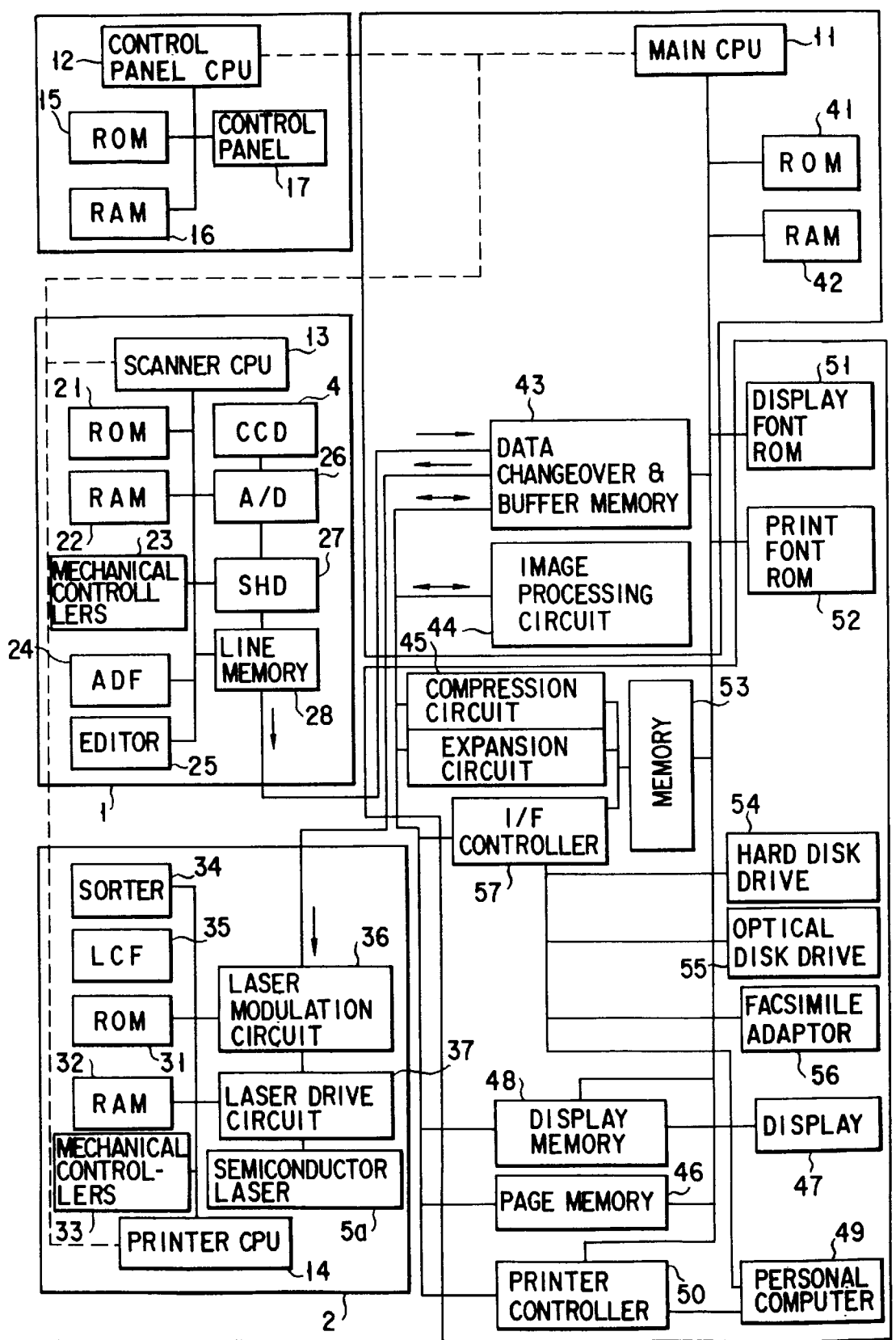
FIG. 3 is a block diagram of the control system in the image forming apparatus of the invention.

FIG. 3 shows a schematic configuration of the control system of the digital copying machine. As seen from the figure, the apparatus is controlled by a main CPU 11, a control panel CPU 12, a scanner CPU 13, and a printer CPU 14.

The main CPU 11 communicates with the control panel CPU 12, scanner 13, and printer CPU 14 and controls them.

The control panel CPU 12 is connected to a ROM 15 and a RAM 16 and on the basis of the data stored in them, senses the switches on a control panel 17 serving as select means, turns on and off the LEDs, and controls the indicator.

The scanner CPU 13 is controlled through communication with the main CPU 11 and on the basis of the data stored in the ROM 21 and RAM 22, controls mechanical controllers 23 including motors and solenoids (not shown), as well as an auto document feeder 24, an editor 25 acting as a coordinate input unit, an analog/digital converting circuit 26, a shading correction circuit 27, and a line memory 28.

The printer CPU 14 is controlled through communication with the main CPU 11 and on the basis of the data stored in the ROM 31 and RAM 32, controls mechanical controllers 33 including motors and solenoids (not shown), as well as a sorter 34, an LCF (Large Capacity Feeder) 35, a laser modulation circuit 36, and a laser drive circuit 37.

Connected to the main CPU 11 are a ROM 41, a RAM 42, a data changeover and buffer memory 43, an image processing section 44, a compression/expansion circuit 45, a page memory circuit 46, a display 47, a display memory 48, a personal computer 49, a printer controller 50, a display font ROM 51, a print font ROM 52, a compression memory 53, a hard disk drive 54, an optical disk drive 55, a facsimile adaptor 56, and an I/F controller 57.

The ROM 41 stores a program for the predetermined operation of the main CPU 1.

The RAM 42 stores the data determined by the ROM 41 and the main CPU 1.

The data changeover and buffer memory 43 switches between where to send the image data read at the scanner section 1 and which data to send to the printer section 2 and performs data buffering.

The image processing section 44 effects the image processing of image data.

The compression/expansion circuit 45 performs the compression/expansion of image data.

The page memory circuit 46 stores image data page by page.

The display memory 48 stores the image data to appear on the display 47.

The printer controller 50 develops the code data supplied from the personal computer 49 into printable image data via the printer section 2.

The display font ROM 51 is a memory in which the font data used in the display memory 48 is stored.

The print font ROM 52 causes the page memory 46 to store the print data from the personal computer 49 or the numerals or symbols corresponding to the desired inputs.

The compression memory 53 stores the data compressed by the compression/expansion circuit 45.

Figure 4:
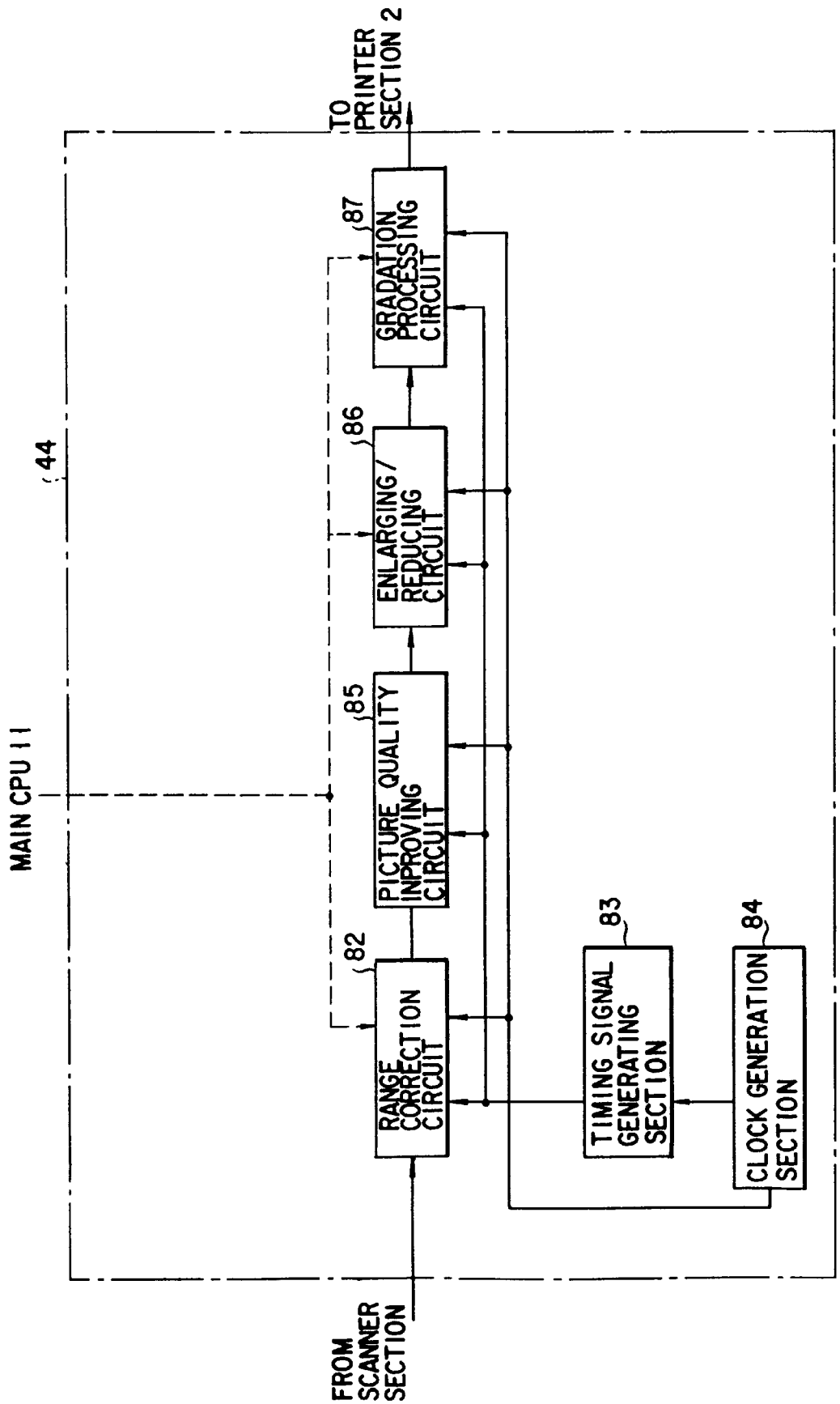
FIG. 4 is a block diagram of the image processing section in the image forming apparatus of the invention.

FIG. 4 shows a schematic arrangement of the image processing section 44. The image processing section 44 comprises a range correction circuit 82, a timing signal generating section 83, a clock generating section 84, a picture quality improving circuit 85, an enlarging/reducing circuit 86, and a gradation processing circuit 87.

The range correction circuit 82, which is part of the feature of the invention and will be explained in detail later, acts as image information correction means and corrects the range of density.

The timing signal generating section 83 generates timing signals and supplies them to a histogram creation circuit 80, the range correction circuit 32, the image improving circuit 85, the enlarging/reducing circuit 86, and the gradation processing circuit 87.

The clock generating section 84 generates clock signals and supplies them to the timing signal generating section 83, histogram creation circuit 80, range correction circuit 82, picture quality improving circuit 85, enlarging/reducing circuit 86, and gradation processing circuit 87.

The picture quality improving circuit 85 improves the picture quality on the basis of the corrected range from the range correction circuit 82.

The enlarging/reducing circuit 86 enlarges and reduces the picture-quality-improved image data supplied from the image improving circuit 85.

The gradation processing circuit 87 performs the gradation processing of the image data supplied from the enlarging/reducing circuit 86.

Figure 1:
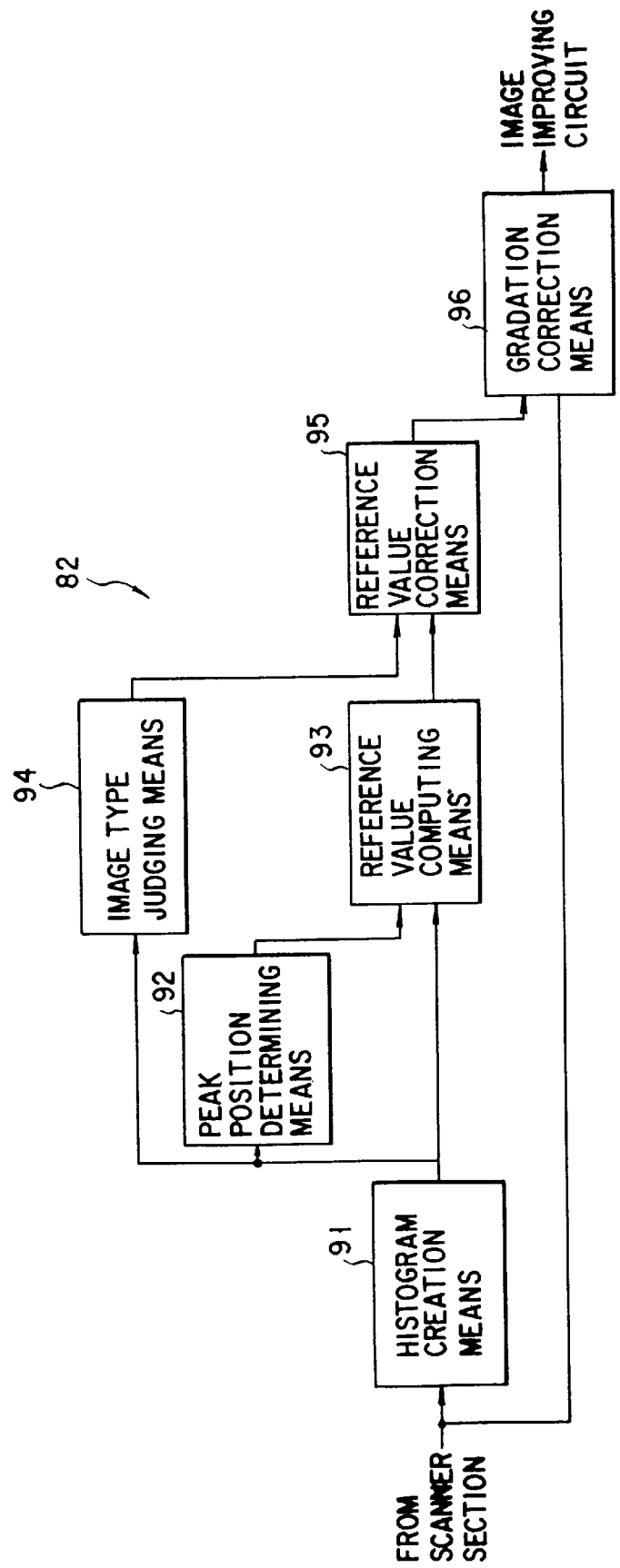
FIG. 1 is a block diagram of a range correction circuit in an image forming apparatus according to an embodiment of the present invention.

FIG. 1 shows a schematic configuration of the range correction circuit 82. The range correction circuit 82, which is part of the feature of the invention, comprises histogram creation means 91, peak position determining means 92, reference value computing means 93, image type judging means 94, reference value correction means 95, and gradation correction means 96. The gradation correction means 96 corrects the density range of the image data on the basis of the correction reference value.

The histogram creation means 91 creates a density histogram (hereinafter, referred to as a histogram) from the data supplied from the scanner section 1.

The peak position determining means 92 senses and determines two peak positions in the histogram created at the histogram creation means 91.

The image type judging means 94 judges whether the image is a photograph or characters.

The reference value correction means 95 corrects the reference value from the reference value computing means 93 on the basis of the image judging result from the image type judging means 94.

The gradation correction means 96 performs a gradation correction which corrects the density range of the image data on the basis of the correction reference value from the reference value correction means 95.

FIG. 5 shows the processing sections corresponding to the individual means constituting the range correction circuit 82.

Specifically, the histogram creation means 91 is composed of a histogram creating section 91a, the peak position determining means 92 is made up of a white peak position sensing section 92a and a black peak position sensing section 92b, the reference value computing means 93 is made up of a reference value computing section 93a and a reset judging section 93b, the image type judging means 94 is composed of a white width judging section 94a, a character frequency judging section 94b, a manuscript type judging section 94c, and a judging result changeover section 94d, the reference value correction means 95 is composed of a reference value select section 95a, a reference value change amount control section 95b, and an erroneous judgment suppressing section 95c, and the gradation correction means 96 is made up of a range correction section 96.

The histogram-creation section 91a creates a histogram from the image data supplied from the scanner section 1. The image data has been obtained by converting the analog signal of the density image data into digital image data (the number of values data) at the A/D converting circuit 26. That is, the image data is the digital image data containing the density information.

The white peak position sensing section 92a senses the white peak position from the created histogram. The black peak position sensing section 92b senses the black peak position from the created histogram.

The white width judging section 94a judges the white width from the sensed white peak position signal and the created histogram. The character frequency judging section 94b judges the character frequency from the sensed white peak position signal, black position signal, and the created histogram.

The reset judging section 93b judges resetting from the character frequency judging result, white peak position signal, and black peak position signal. When judging that resetting has been done, it will reset the histogram creation section 91a.

The manuscript type judging section 94c judges the type of manuscript from the white width judging result and the character frequency judging result. On the basis of the judging result, the judging result changeover section 94d switches the image type judging result signal between photograph or characters.

The reference value computing section 93a calculates the references for white and black from the created histogram, white peak position signal, and black position signal.

The reference value select section 95a selects the reference values for white and black from the reference value signal whose reference values for white and black have been calculated and the image type judging result signal. The reference value change amount control section 95b controls the change amount of the selected reference values for white and black. The erroneous judgment suppressing section 95c suppresses erroneous judgment.

The range correction section 96a performs the range correction of the image data supplied from the scanner section 1 and delayed one line at a line buffer acting as delay means explained later.

FIG. 6 is a circuit diagram of the white peak position sensing section 92a and the white width judging section 94a. The white peak position sensing section 92a is composed of a selector 100, a flip-flop 101, and a white peak enable signal producing circuit 102. The histogram HF created at the histogram creation section 91a is inputted to the selector 100. The selector 100 selects the histogram HF according to the white peak enable signal and writes the result into the flip-flop 101, which outputs a white peak position signal MFW.

The white width judging section 94a comprises a totalizing circuit 103, an enable signal producing circuit 104 of CR and CL, selectors 105, 106, flip-flops 107, 108, and an AND circuit 109. It produces a signal MFH of the white width judging result from the supplied white peak position signal MFW and the histogram HF.

Figure 7:
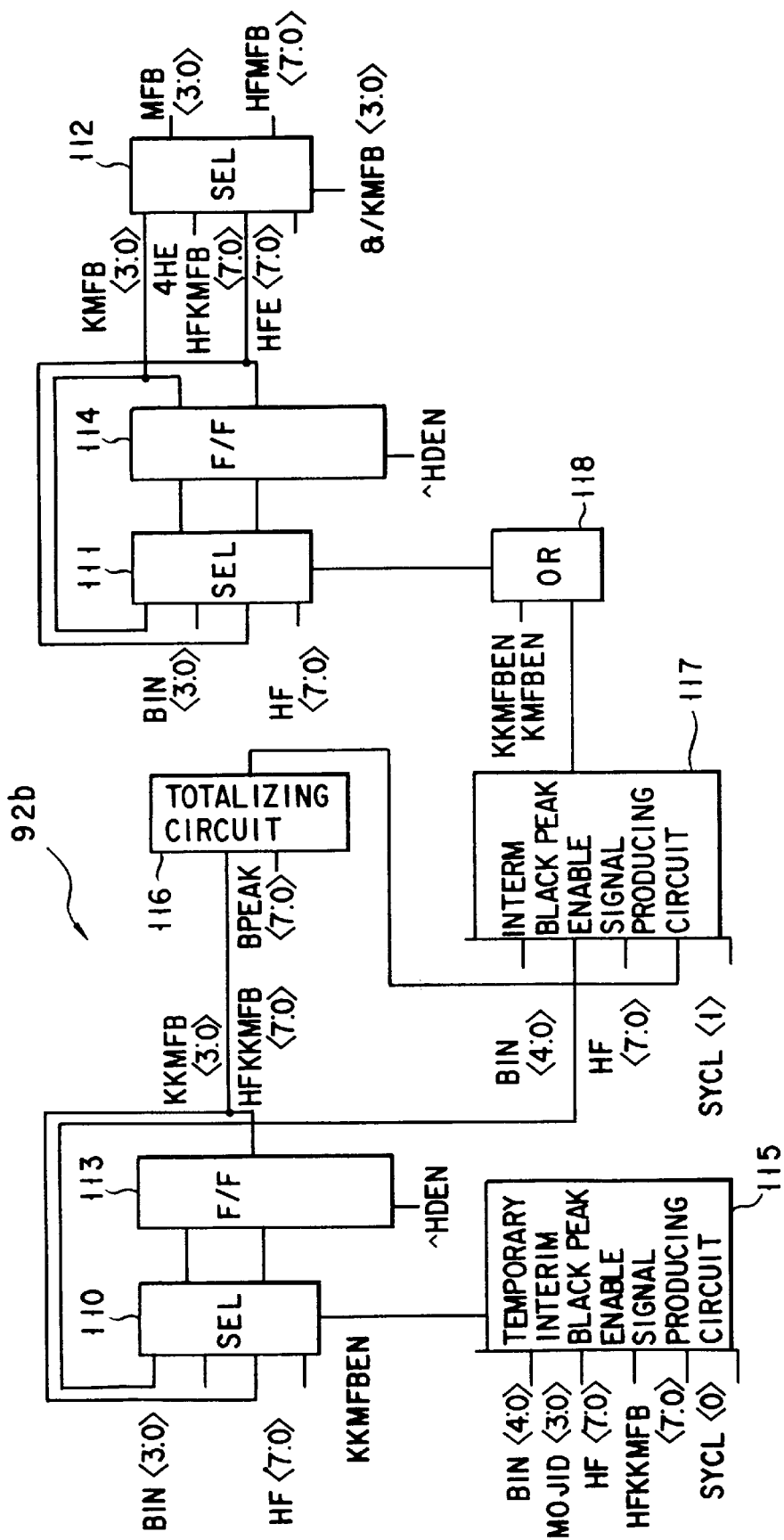
FIG. 7 is a circuit diagram of the black peak position sensing section.

FIG. 7 is a circuit diagram of the black peak position sensing section 92b, which comprises selectors 110, 111, 112, flip-flops 113, 114, a temporary interim black peak enable signal producing circuit 115, a totalizing circuit 116, an interim peak enable signal producing circuit 117, and an OR circuit 118. It produces a black peak position signal MFB from the supplied histogram HF.

Figure 8:
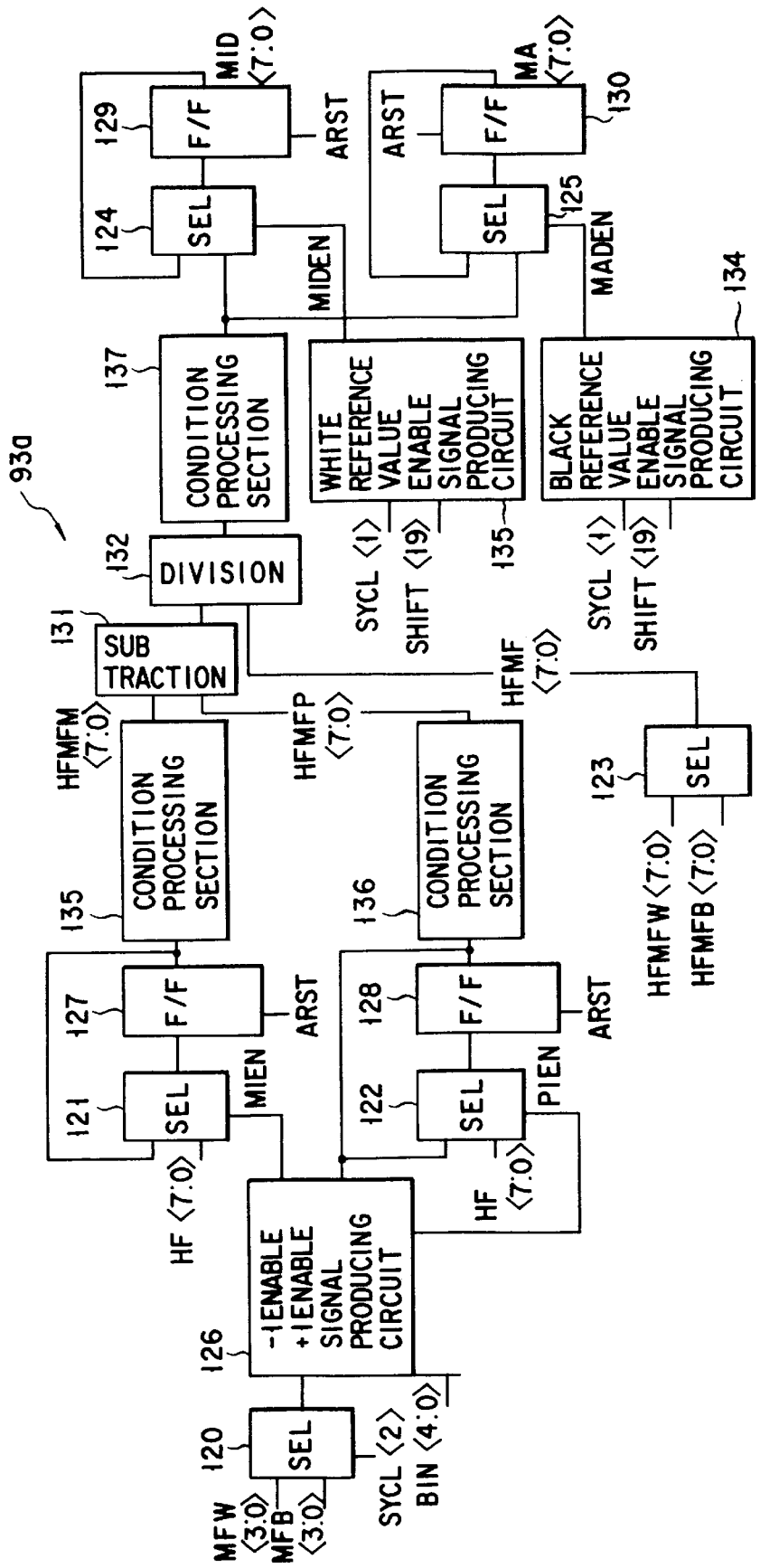
FIG. 8 is a circuit diagram of the reference value computing section.

FIG. 8 is a circuit diagram of the reference value computing section 93a, which comprises selectors 120, 121, 122, 123, 124, 125, a −1 enable +1 enable signal producing circuit 126, flip-flops 127, 128, 129, 130, a subtraction circuit 131, a division circuit 132, a white reference value enable signal producing circuit 133, a black reference value enable signal producing circuit 134, and condition processing sections 135, 136, 137. It produces a white reference value signal MID and a black reference value signal MAD from the supplied white peak position signal MFW and black peak position signal MFB and histogram HF.

Figure 9:
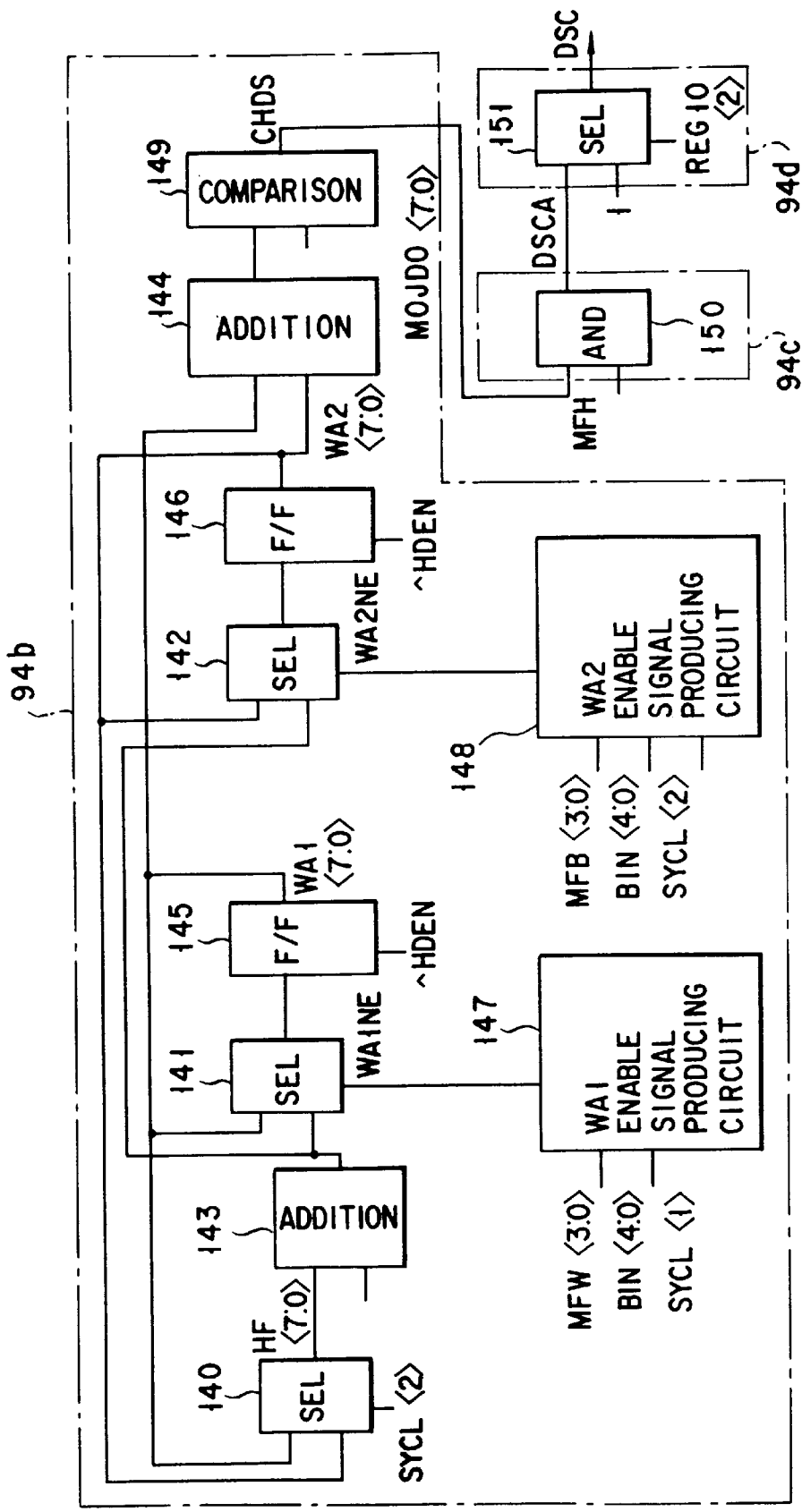
FIG. 9 is a circuit diagram of the character frequency judging section, manuscript type judging section, and judgment result changeover section.

FIG. 9 is a circuit diagram of the character frequency judging section 94b, the manuscript type judging section 94c, and the judging result changeover section 94d. The character frequency judging section 94b is composed of selectors 140, 141, 142, addition circuits 143, 144, flip-flops 145, 146, a WA1 enable signal producing circuit 147, a WA2 enable signal producing circuit 148, and a comparing circuit 149. It produces a signal CHDS as the character frequency judging result from the supplied white peak position signal MFW, black peak position signal MFB, and histogram HF.

The manuscript type judging section 94c is composed of an AND circuit 150 and produces a signal DSCA as the manuscript type judging result from the supplied signal CHDS of the character frequency judging result and signal MFH of the white width judging result. The judging result changeover section 94d is composed of a selector 151 and produces an image type judging result signal DSC by switching between a photograph and characters in the signal DSCA of the manuscript type judging result.

Figure 10:
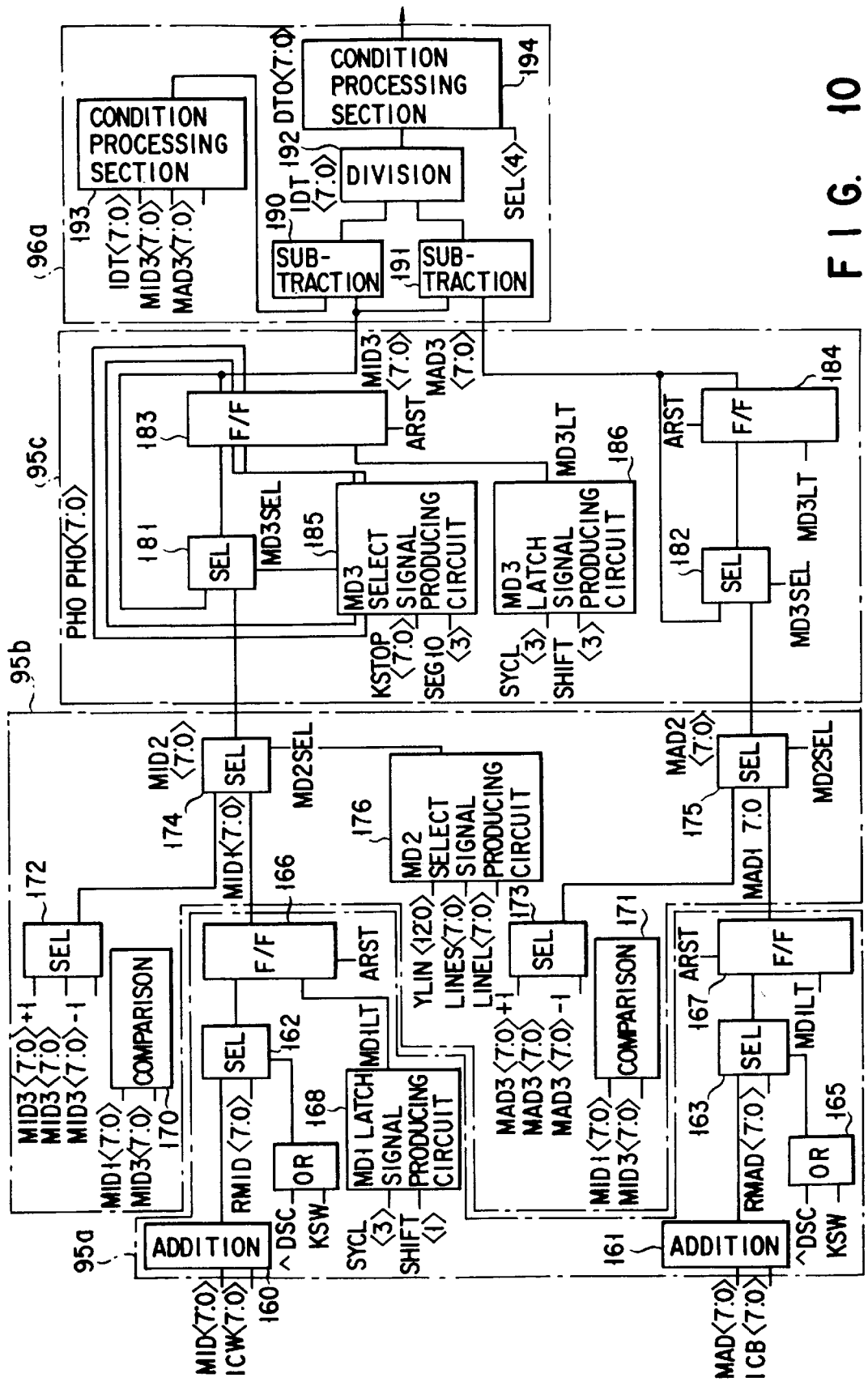
FIG. 10 is a circuit diagram of the reference-value select section, reference-value change amount control section, erroneous judgment suppressing section, and range correction section.

FIG. 10 is a circuit diagram of the reference value select section 95a, reference value change amount control section 95b, erroneous judgment suppressing section 95c, and range correction section 96a.

The reference value select section 95a is composed of addition circuits 160, 161, selectors 162, 163, OR circuits 164, 165, flip-flops 166, 167, and an MD1 latch signal producing circuit 168. It produces a white reference value signal and black reference value signal MAD1 whose white and black reference values are selected respectively from the white reference value signal MID and black reference value signal MAD and image type judging result signal DSC.

The reference value change amount control section 95b is composed of comparing circuits 170, 171, selectors 172, 173, 174, 175, and an MD2 select signal producing circuit 176. It produces a white reference value signal MID2 and black reference value signal MAD2 whose change amount is controlled, from the supplied white reference value signal MID1 and black reference value signal MAD1.

The erroneous judgment suppressing section 95c is made up of selectors 181, 182, flip-flops 183, 184, an MD3 select signal producing circuit 185, and an MD3 latch signal producing circuit 186. It produces a white reference value signal MID3 and black reference value signal MAD 3 that suppress erroneous judgment, from the supplied white reference value signal MID2 and black reference value signal MAD2.

The range correction section 96a is made up of subtraction circuits 190, 191, a division circuit 192, and condition processing sections 193, 194. It produces the range-corrected image data IDT0 from the supplied white reference value signal MID3, the black reference value signal MAD3, and the image data supplied from the scanner section 1 and delayed one line at a line buffer explained later.

Figure 11:
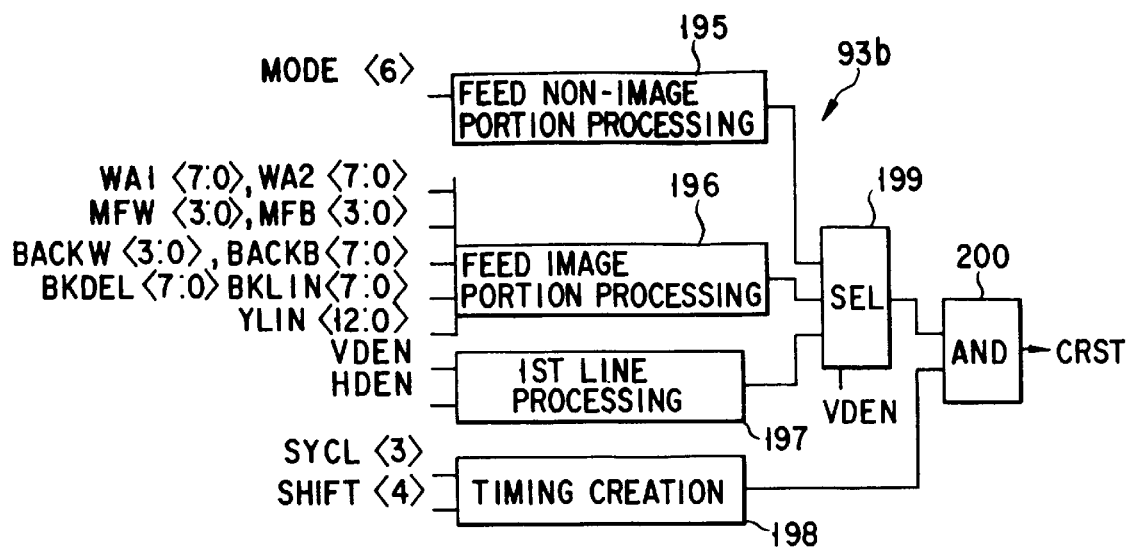
FIG. 11 is a circuit diagram of the reset judging section.

FIG. 11 is a circuit diagram of the reset judging section 93b. The reset judging section 93b is composed of a feed non-image portion processing section 195, a feed image portion processing section 196, a first line processing section 197, a timing producing section 198, a selector 199, and an AND circuit 200. It outputs a reset signal CRST to the histogram creation section 91a in response to a vertical sync. signal VDEN.

Figure 12A:
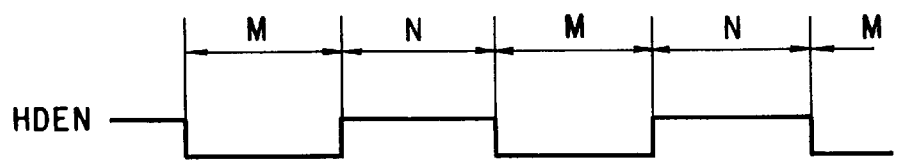
FIG. 12A shows processing timing in the range correction process.

FIG. 12A shows the timing in the range correction process.

In FIG. 12A, the horizontal sync. signal HDEN is composed of an image portion M and a non-image portion N. In the image portion M, the histogram creation section 91a and range correction section 96a effect processing. In the non-image portion N, a reference value producing section K effects processing. The reference value producing section K comprises the white peak position sensing section 92a, black peak sensing section 92b, reference value computing section 93a, reset judging section 93b, white width judging section 94a, character frequency judging section 94b, manuscript type judging section 94c, judging result changeover section 94d, reference value select section 95a, reference value change amount control section 95b, and erroneous judgment suppressing section 95c.

Figure 12B:
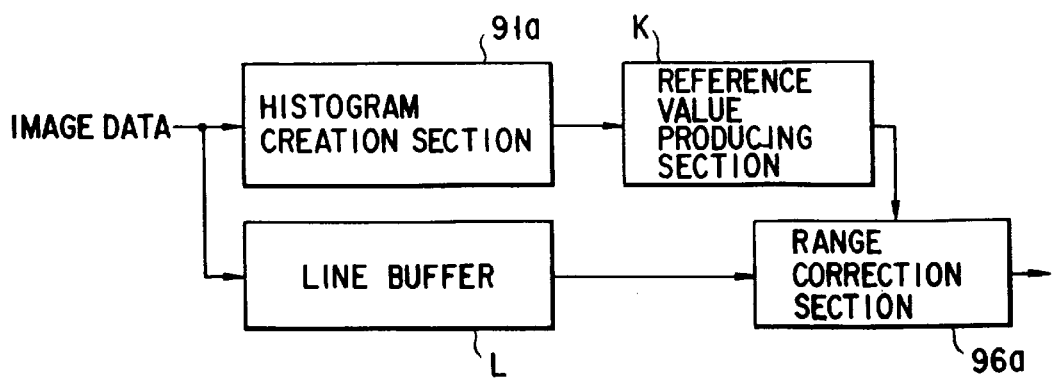
FIG. 12B is a diagram to help explain the operation of the range correction circuit.

FIG. 12B is a diagram to help explain the operation of the range correction circuit. In the figure, for the image portion M, the histogram creation section 91a effects processing and at the same time, the range correction section 96a corrects the image data delayed one line at the line buffer L. Then, the reference value producing section K effects processing in the non-image portion N.

Figures 13A, 13B:
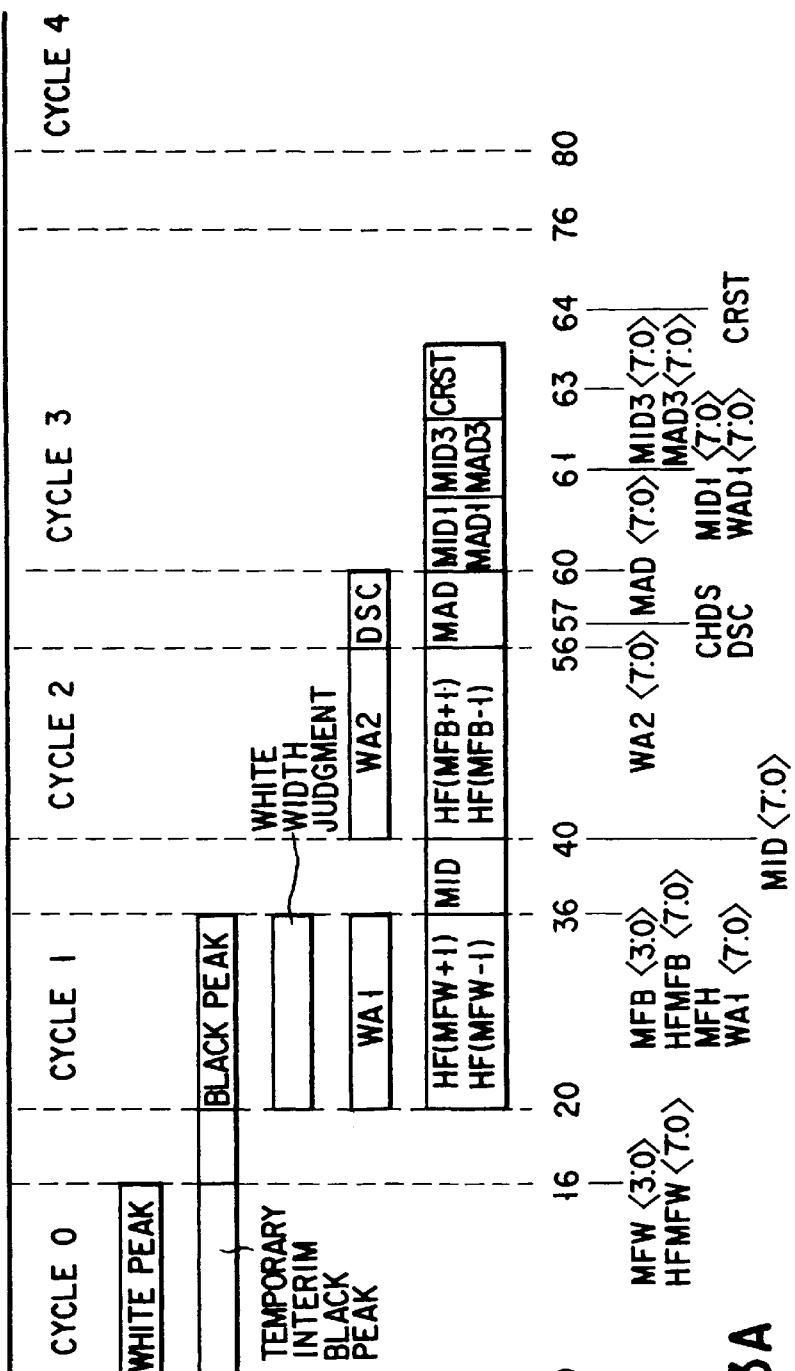
FIGS. 13A and 13B show the processing cycles in the reference value creating section at the time of entering a non-image section.

FIGS. 13A and 13B show the processing cycles in the reference value producing section K when the non-image portion N is reached. In FIG. 13A, the processing starts at cycle 0. First, the white peak position sensing section 92a and black peak position sensing section 92b start operation and determine values in cycle 1, cycle 2, and cycle 3 in that order. The processing finishes with the signal CRST outputted from the reset judging section 93b in cycle 3 and stops in cycle 4. The individual values are retained as long as the non-image portion N lasts.

As shown in FIG. 13B, one cycle consists of 20 steps and is expressed by two types of codes: binary code BIN<4:0> and signal SHIFT <19:0> coded at a shift register. Here, <4:0> is a symbol meaning 5-bit data based on the 0-th signal to fourth signal. Hereinafter, the symbol is used in the same meaning. By combining SYCL<4:0>, SHIFT<19:0>, and BIN<4:0>, the latch timing for each block is produced.

With such a configuration, the operation of the range correction circuit 82 of the present embodiment will be explained.

The histogram creation means 91 gives multiple values to the image data read at the scanner section 1 by means of, for example, an A/D converter, creates a histogram with density on the abscissa and the frequency of specific density on the ordinate, and outputs a histogram signal.

Figure 14:
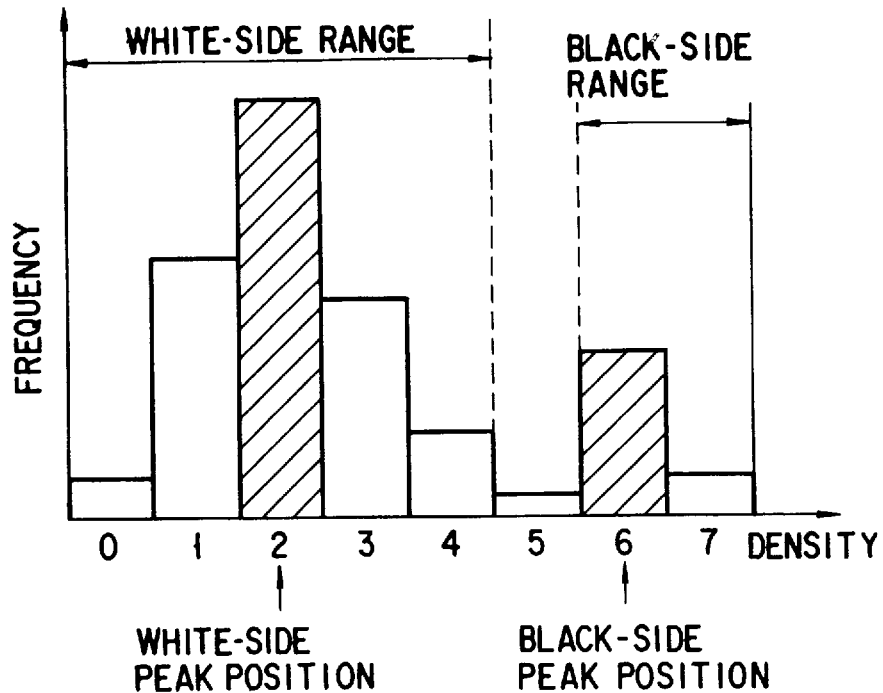
FIG. 14 is a histogram with the number of values given to the input image signal being 8.

FIG. 14 is a histogram with the number of values given to the input image signal determined to be 8. The peak position determining means 3 determines two peak positions. For example, the shapes of histogram are roughly divided into the following three types:

(1) a histogram with only one peak
(2) a histogram with two peaks
(3) a histogram with three peaks or more In addition to these three types, there is the following type:

(4) a histogram with more than one hill whose frequency may meet the requirements for peak position First, a histogram of type (1) with only one peak will be described.

Figure 15:
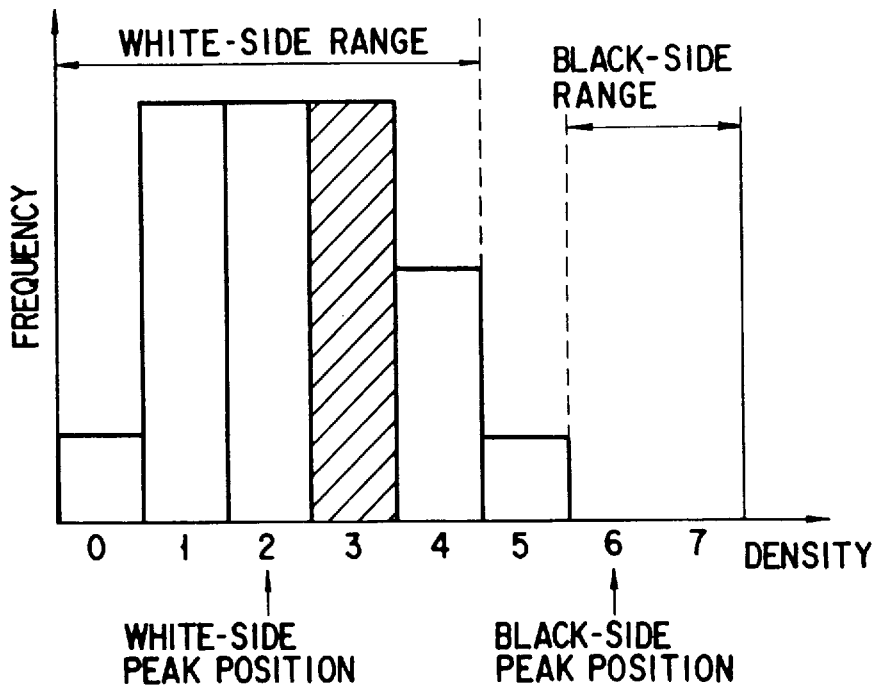
FIG. 15 is a histogram with only one peak and the number of values given to the input image signal being 8.

FIG. 15 is a histogram with only one peak and the number of values given to the input signal being 8. Since two peaks, the peak for white and peak for black, are to be determined, the range in which the white peak is searched for and the range in which the black peak is searched for have been determined in advance. In FIG. 15, the range of "0" to "4" is determined to be the white range and the range of "6" to "7" is determined to be the black range.

In FIG. 15, it is in the white side that the peak exists. On the side where the peak exists (the white side in FIG. 15), the peak position is determined in the same manner as with a histogram of type (2) with two peaks. On the side without a peak (the black side in FIG. 15), what meets the conditions previously given is determined to be the peak position. Examples of the conditions are: "a hill with the highest density", "a hill with the lowest density", and "a hill whose density is in the middle of the white side (black side) range."

Thus, even when a peak is not determined because the frequency is 0 or the same in the white side (black side) range, a peak position can be determined for each of the white side and the black side. For instance, in the histogram of FIG. 15, if the white side has "a hill with the highest density" and the black side has "a hill with the lowest density", the white peak position will be 3 and the black peak position will be 6.

Now, a histogram of type (2) with two peaks will be described.

FIG. 14 is a histogram with two peaks and the number of values given to the input image signal being 8. Since two peaks, the peak for the white side and the peak for the black side, are to be determined, the range in which a peak on the white side is searched for and the range in which a peak on the black side is searched for have been determined in advance. In FIG. 14, the range of "0" to "4" is determined to be the white range and the range of "6" to "7" is determined to be the black range. In the ranges, what meets the conditions previously given is determined to be the peak position. Examples of the conditions are: "a hill whose frequency is the highest in the white side (black side) range", "a hill whose frequency is the n-th highest in the white side (black side) range", "an adjacent hill on the right of the hill whose frequency is the highest in the white side (black side) range", "an adjacent hill on the left of the hill whose frequency is the highest in the white side (black side) range", "a hill whose frequency is closest to n% of the hill whose frequency is the highest in the white side (black side) range", "one with the highest density among the peaks in the white side (black side) range", and "a hill with the lowest density among the peaks in the white side (black side) range."

By combining one or more of these conditions, the peak position is determined. A case where there are more than one hill of the same frequency will be explained later. For instance, in the histogram of FIG. 14, if both the white side and the black side have "a hill whose frequency is the highest in the white side (black side) range", the white peak position will be 2 and the black peak position will be 6.

Now, a histogram of type (3) with three peaks will be explained.

FIG. 16 is a histogram with three peaks and the number of values given to the input image signal being 8. Since two peaks, the peak for the white side and the peak for the black side, are to be determined, the range in which a peak on the white side is searched for and the range in which a peak on the black side is searched for have been determined in advance. In FIG. 16, the range of "0" to "4" is determined to be the white range and the range of "6" to "7" is determined to be the black range. Three hills that may become peak positions are determined to be A, B, and C in ascending order of density. When there is only one peak in the white side (black side) range (the black side in FIG. 16), a peak position will be determined as with a histogram of type (2) with two peaks. When there is more than one peak in the white side (black side) range, what meets the conditions previously given is determined to be the peak position. Examples of the conditions are: "a hill whose frequency is the highest", "a hill whose frequency is the n-th highest", "a hill whose density is the highest", "a hill whose density is the lowest", "if a hill whose frequency is the second highest has a frequency n% or less of that of the hill whose frequency is the highest, the hill with the highest frequency will be selected; otherwise, the hill with the highest density will be selected", and "one in the middle of three hills in the white side (black side) range.

By combining one or more of these conditions, a peak position is determined. A case where there are more than one hill of the same frequency will be explained later. In the histogram of FIG. 16, if both the white side and the black side have "a hill whose frequency is the highest in the white side (black side) range", the white peak position will be 1 of A and the black peak position will be 7 of C.

Now, a histogram of type (4) with more than one hill whose frequency may meet the requirements for peak position.

When more than one of the same frequency exists as shown in FIG. 15, what meets the conditions previously given will be determined to be the peak position. Examples of the conditions are: "a hill whose density is the highest among the peak position candidates", "a hill whose density is the lowest among the peak position candidates", and "a hill whose density is in the middle among the peak position candidates."

In this way, the peak positions are determined.

The reference value computing means 93 calculates a reference value from the peak position signal determined at the peak position determining means 92 as described above and the histogram signal produced at the histogram producing means 91. Both of the white reference value and black reference value are calculated using the same equation.

FIG. 17 shows the peak position of the histogram and the frequencies of the hills on its right and left sides. Here, P indicates the center density value of the peak position and P−1 and P+1 represent the density of the hill on the left side of P and the density of the hill on the right side of P. H[P], H[P−1], and H[P+1] indicate the frequencies of P, P−1, and P+1, respectively. W indicates the density width of the density histogram.

The reference value is obtained using the following equations.

If P−1 or P+1 does not exist, the values of fictitious hills will be determined under the conditions previously given as follows:

$$H[P-1]=0 \text{ or } H[P+1]=0$$

$$H[P-1]=H[P] \text{ or } H[P+1]=H[P]$$

If H[P−1] or H[P+1] is larger than H[P], $$H[P-1]=H[P] \text{ or } H[P+1]=H[P] \text{ will be given.}$$

The reference value K is calculated as follows:

$$K=P \times W + W/2 + (H[P+1]-H[P-1])/H[P] \times W/2$$

Hereinafter, it is assumed that the white reference value= Kw and the black reference value=Kb.

By using the above equations, the reference value computing means 93 computes a reference value and outputs a reference value signal. Because the value of the reference value signal from the reference value computing means 93 is computed at regular intervals previously given, a new reference value K(n) is determined at regular intervals.

When the reference value changes greatly at regular intervals, irregularity is liable to take place in the output image after gradation correction. Therefore, the reference value correction means 95 corrects the reference value of the reference value signal from the reference value computing means 93.

The details of the reference value correcting method will be give below.

Figure 18:
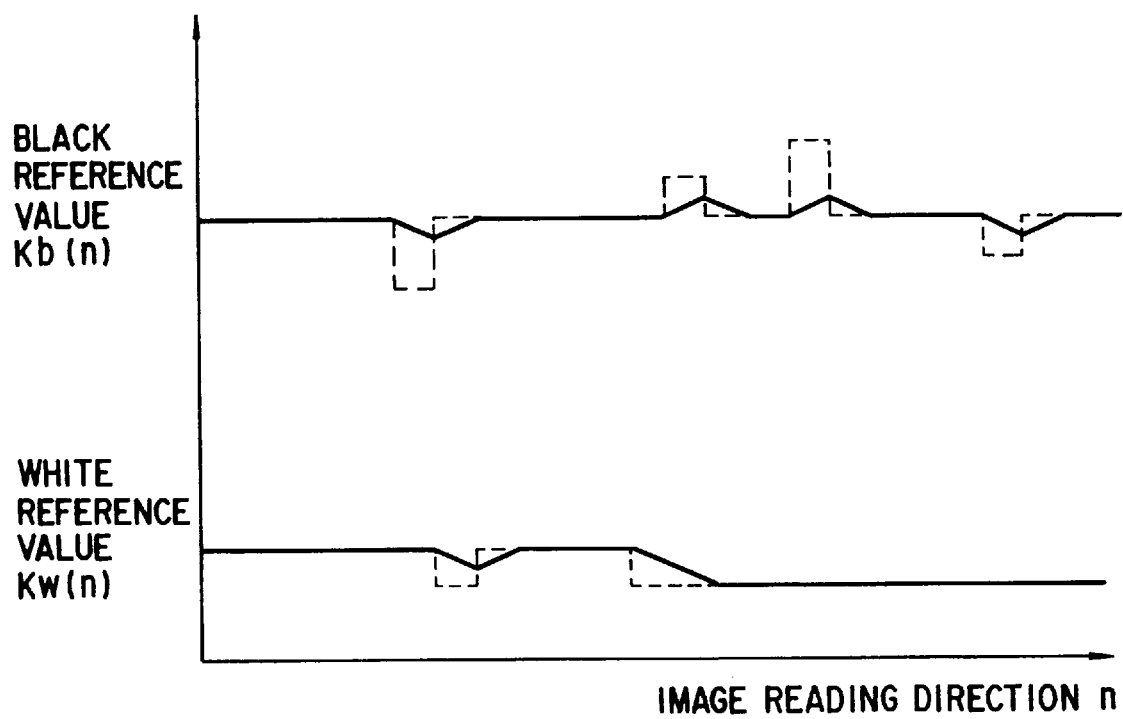
FIG. 18 is a diagram to help explain the change of the reference value computed at regular intervals.

FIG. 18 shows changes in the reference values Kw(n) and Kb(n) computed at regular intervals (n). The broken lines indicate the reference values before correction and the solid lines indicate the reference values after correction. Since the reference value suppresses abrupt density changes in the output image, it is desirable that the reference values should change smoothly.

The reference value Kw(n), Kb(n) are corrected on the basis of the image type judging result signal from the image type judging means 94, the reference value signal from the reference value computing means 93, the photo image reference value constant previously given, the reference value change amount constant, and the offset constant.

Hereinafter, the way of computing a correction reference value K2(n) of the reference value K(n) to suppress the amount of change will be described.

First, in correcting the reference value for each of the created histograms, the reference value K(n−1) determined in the cycle of the preceding correction is compared with the reference value K(n) currently determined.

When the reference value reduces sharply below the constant, it will be suppressed to the constant as follows:

If K(n)<K(n−1)−reference value change amount constant, then K2(n)=K(n−1)−reference value change amount constant When the reference value increases sharply over the constant, it will be suppressed to the constant as follows:

If K(n)>K(n−1)+reference value change amount constant, then K2(n)=K(n−1)+reference value change amount constant If the change of the reference value is smaller than the constant, the reference value need not be corrected.

That is, if K(n−1)−reference value change amount constant<K(n)<K(n−1)+reference value change amount constant, K2(n)=K(n) will be given.

Then, the determined K2(n) is changed using an offset constant:

$$K3(n)=K2(n)+\text{offset constant}$$

Furthermore, K3(n) is changed using the image type judging result from the image type judging means 94.

When the image type judging result signal from the image type judging means 94 is associated with photograph judgment, the reference value will be used as a photo image constant: K(n)=photo image constant When the image type judging result signal is associated with character judgment, the reference value K3(n) added with the offset constant will be given:

$$K(n)=K3(n)$$

Then, the reference value correction means 95 counts how long the characters or photograph as the result of the image type judging result signal from the image type judging means 94 lasts, and then corrects the reference value further.

Figures 19A, 19B:
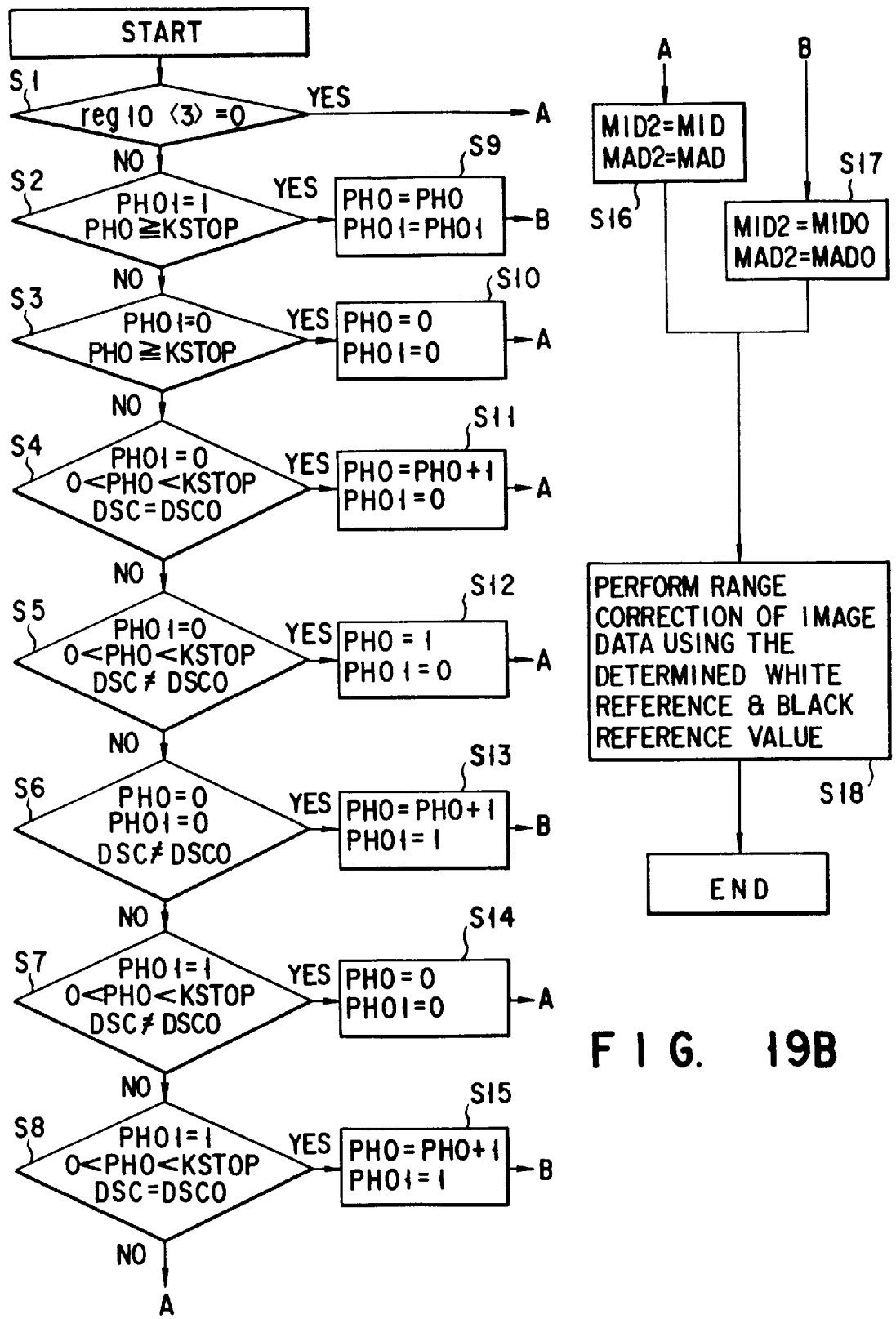
FIGS. 19A and 19B are flowcharts to help explain the operation of correcting the reference value.

FIGS. 19A and 19B are flowcharts for the reference value correcting operation. The symbols used are listed below and the operation of correcting them will be explained. The initial values of the judging result counter and judging result change flags are PHO=1, PHO1=0, and DSC0=1, respectively.

The respective symbols have the following meanings:

DSC: manuscript judging result

DSC0: the preceding manuscript judging result

PHO: judging result counter

PHO1: judging result change flag

KSTOP: judging result counter threshold value reg10[3]: reference value correction control register (yes= 0/no=1)

Furthermore, the individual reference values are defined as follows:

MID: white reference value before correction

MAD: black reference value before correction

MID0: the preceding white reference value

MAD0: the preceding black reference value

MID2: a white reference value used for gradation correction

MAD2: a black reference value used for gradation correction

When reference value control correction register reg10 [3]=1, the following eight judgments (S1 to S8) will be made as the occasion demands (S1).

The reference value is corrected suitably to produce a white reference value and a black reference value, which are used to perform gradation correction of the image information (S18).

(1) If (PHO≧KSTOP) and (PHO1=1) (S2),
  PHO=PHO and PHO1=PHO1 will be set (S9) and then MID2=MID0 and MAD2=MAD0 will be set (S16).
(2) If (PHO≧KSTOP) and (PHO1=0) (S3),
  PHO=0 and PHO1=0 will be set (S10) and then MID2=MID and MAD2=MAD will be set (S16).
(3) If (0<PHO<KSTOP) and (PHO1=0) and (DSC=DSC0) (S4),
  PHO=PHO+1 and PHO1=0 will be set (S11) and then MID2=MID0 and MAD2=MAD will be set (S16).
(4) If (0<PHO<KSTOP) and (PHO1=0) and (DSC≠DSC0) (S5),
  PHO=1 and PHO1=0 will be set (S12) and then MID2=MID0 and MAD2=MAD will be set (S16).
(5) If (PHO=0) and (PHO1=0) and (DSC≠DSC0) (S6),
  PHO=PHO+1 and PHO1=1 will be set (S13) and then MID2=MID0 and MAD2=MAD0 will be set (S17).
(6) If (0<PHO<KSTOP) and (PHO1=1) and (DSC≠DSC0) (S7),
  PHO=0 and PHO1=0 will be set (S14) and then MID2=MID and MAD2=MAD will be set (S16).
(7) If (0<PHO<KSTOP) and (PHO1=1) and (DSC=DSC0) (S8),
  PHO=0+1 and PHO1=1 will be set (S15) and then MID2=MID0 and MAD2=MAD0 will be set (S17).
(8) If the case does not come under any one of the above conditions,
  PHO=PHO, PHO1=PHO1 will be set and then MID2=MID and MAD2=MAD will be set (S16).

Similarly, if reg10[3]=0,
  MID2=MID and MAD2=MAD will be set (S16).

As described above, by correcting the reference value of the image information according to the type of image, not across the board, more proper gradation correction of image information can be made.

The gradation correction means 96 performs range correction of the image data using the corrected reference value signal outputted from the reference value correction means 95 (S18). In this case, the gradation correction means 96 makes a correction linearly in the width of 0 to F on the basis of the calculated white reference value Kw(n) and black reference value Kb(n).

Namely, the gradation correction means 96 performs gradation correction of the image signal using the following equation and supplies the output image data:

$$D2 = (D - Kw(n))/(Kb(n) - Kw(n)) \times FF(hex)$$

However, when D<Kw(n), D=Kw(n)
when D>Kb(n), D=Kb(n).

The gradation correction means computes a reference value from the histogram at regular intervals and using the value, effects gradation correction.

FIGS. 20A to 20D and FIGS. 21A and 21B are timing charts to help explain the operation of judgment correction in the present invention. Hereinafter, the judgment correction explained in the flowchart of FIG. 19 will be described.

For range correction in the invention, a histogram of the image is created for each section (each line), it is judged on the basis of the obtained value whether the manuscript is of character or of photograph, and it is determined what the reference value is, if the manuscript is of character. Because irregularity will occur in the image density if the reference value suddenly changes greatly, however, the amount of change is suppressed so that the reference value may change little by little (reference value change amount control).

In addition to the reference value change amount control by which the reference value is forced to change gradually, the present invention performs the process of verifying whether the judging result is correct (judgment correction).

The judgment correction is carried out as follows. The judging result continues to be character and suddenly changes to photograph at a particular line. In this case, it is doubtful whether the manuscript has actually changed to a photograph manuscript, and there is a possibility that the judging result will return to character after several lines are judged, because of erroneous judgments. When the judging result changes from character to photograph, or vice versa, a flag (PHO1) is set (PHO=1) and the period during which the result remains unchanged is counted (a PHO is provided as a counter, which counts up the duration). The period is referred to as a monitoring period. Specifically, the judgment state is monitored by counting up the PHO until the monitoring period (PHO) has exceeded the judging result counter threshold (KSTOP) or the judging result has changed again.

The following two cases can be considered, depending on how long the monitoring period (PHO) lasts:

1) Monitoring period (PHO)<Judging result counter threshold (KSTOP)

It is judged that the judgment on the section is temporary, that is, the judgment is incorrect.

2) Monitoring period (PHO)>Judging result counter threshold (KSTOP)

It is judged that the judgment on the section is correct and has entered a new area.

Furthermore, how the reference value is dealt with according to these two cases will be explained using the following six examples with reference to FIGS. 20A, 20B, 20C, 20D, and FIGS. 21A and 21B.

Figure 20A:
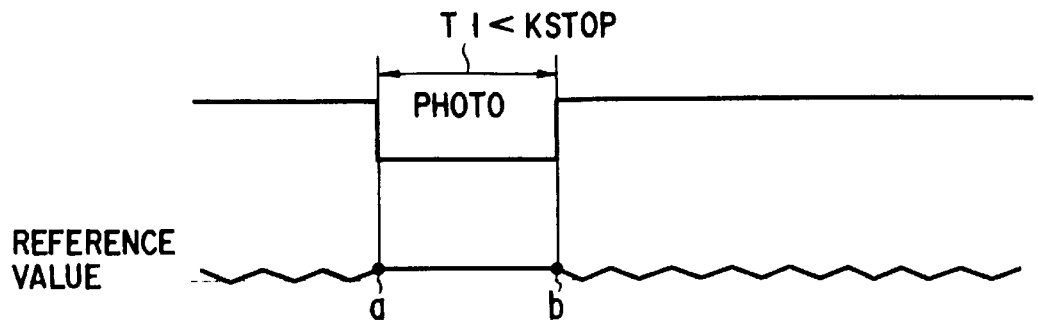

1) Case of FIG. 20A where the judging result of photograph instantly returns to character monitoring period T1<threshold (KSTOP)

It is judged that the judgment during the monitoring period is incorrect.

Thus, the change of the reference value is stopped at the time a when the judging result has changed for the first time and the reference value at time a is reserved.

MID2=MID0 (the reference value on the preceding line= the white reference value at the time when the judging result has changed)

MAD2=MAD0 (the reference value on the preceding line=the black reference value at the time when the judging result has changed)

At the time b when the judging result has returned to character, the recalculated value is used directly as the reference value.

MID2=MID (the white reference value computed on the current line)

MAD2=MAD (the black reference value computed on the current line)

Figure 20B:
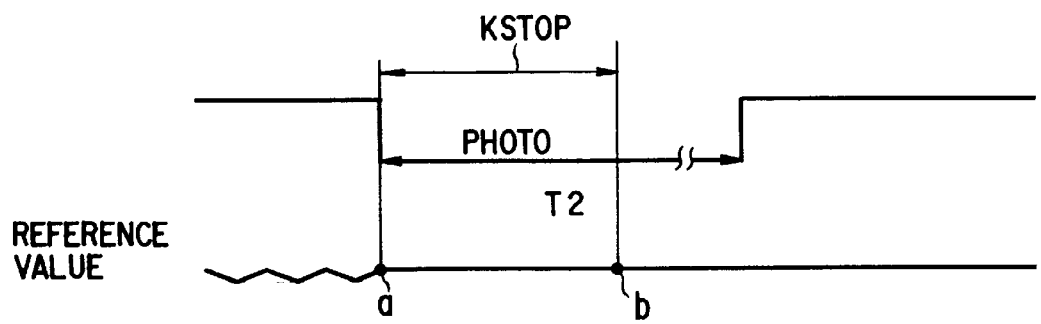

2) Case of FIG. 20B where the judging result of photograph does not return to character monitoring period T2>threshold (KSTOP)

It is judged that the judgment during the monitoring period is correct.

Thus, the change of the reference value at the time a when the judging result has changed for the first time is stopped temporarily. Because the judging result continues to be photograph even at time b when the monitoring period has exceeded the threshold (KSTOP), the image density will not change further, so that the reference value is kept fixed until the end of the image has been reached.

MID2=MID0 (the reference value on the preceding line= the white reference value at the time when the judging result has changed)

MAD2=MAD0 (the reference value on the preceding line=the black reference value at the time when the judging result has changed)

Figure 20C:
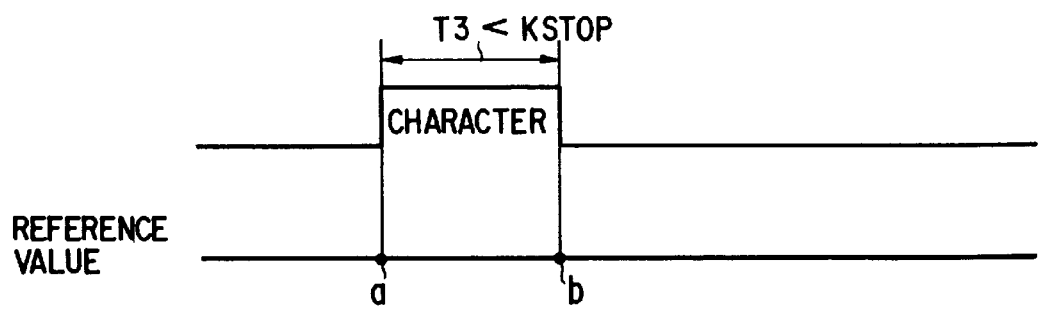

3) Case of FIG. 20C where the judging result of character instantly returns to photograph monitoring period T3<threshold (KSTOP)

It is judged that the judgment (of character) during the monitoring period is incorrect.

Thus, the change of the reference value is stopped at the time a when the judging result has changed for the first time and the reference value at time a is maintained. Because the correct judging result was photograph, there is no apparent change in the value even if the reference value is held.

MID2=MID0 (the reference value on the preceding line= the white reference value at the time when the judging result has changed)

MAD2=MAD0 (the reference value on the preceding line=the black reference value at the time when the judging result has changed)

At the time be when the judging result has returned to photograph, the recalculated value (the fixed value because the reference value is for photograph) is used directly as the reference value.

MID2=MID (the white reference value computed on the current line)

MAD2=MAD (the black reference value computed on the current line)

Figure 20D:
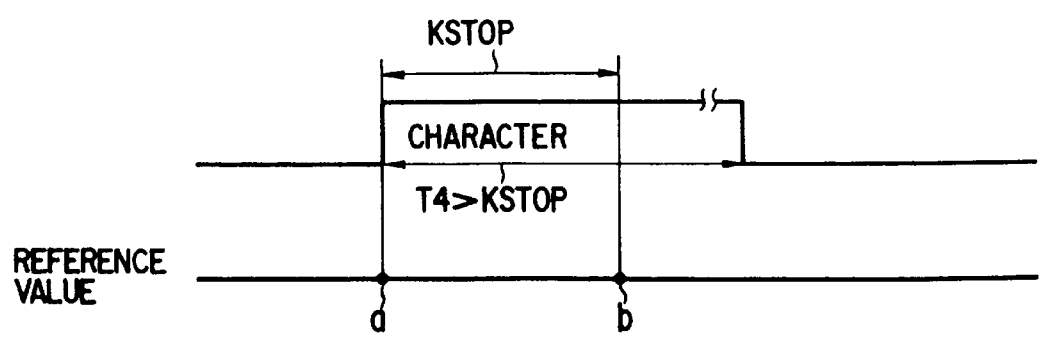

4) Case of FIG. 20D where the judging result of character does not return to photograph monitoring period T4>threshold (KSTOP)

It is judged that the judgment during the monitoring period is correct.

Thus, the change of the reference value is stopped at the time a when the judging result has changed for the first time and the reference value at time a is reserved. Because the judging result shows character at time b when the monitoring period has exceeded the threshold, the image density will not change further, so that the reference value is kept fixed until the end of the image has been reached.

MID2=MID0 (the reference value on the preceding line= the white reference value at the time when the judging result has changed)

MAD2=MAD0 (the reference value on the preceding line=the black reference value at the time when the judging result has changed)

Basically, the process of correcting the reference value is performed according to the above four cases. In the case of processing the leading edge of the image, when the judging result shows photograph, either of the following two processes will be carried out, depending on the condition:

5) Case of FIG. 21A where the leading edge of an image starts with a photograph and the judging result of photograph instantly returns to character monitoring period T5<threshold (KSTOP)

It is judged that the judgment of photograph during the monitoring period is incorrect.

Thus, at the time b when the judging result has changed to character, the calculation result is used as the reference value, MID2=MID (the white reference value computed on the current line)

MAD2=MAD (the black reference value computed on the current line)

6) Case of FIG. 21B where the leading edge of an image starts with a photograph and the judging result of photograph does not return to character monitoring period T6>threshold (KSTOP)

It is judged that the judgment of photograph is correct and the reference value is fixed completely at the time b when the monitoring period has exceeded the threshold.

By performing the process of determining the reference value according to the judging processes as described above, it is possible to realize the density correction of image information more suitable for the type of manuscript.

As described above, with the embodiment, it is possible to perform optimal gradation of images in real time using density histograms.

As described above in detail, according to the present invention, there is provided an image forming apparatus capable of performing optimal gradation correction in real time using the reference values of gradation correction obtained from the density histograms of the target image.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus which reads an image in lines containing density information on each pixel, comprising:

means for forming a density histogram having frequency of each density corresponding to the density information about digital image in a particular area;

means for determining a peak density value at which the frequency of the density histogram peaks;

means for detecting a type of the image corresponding to the density histogram;

means for, while the detecting means detects the type of the image as a character document, calculating out first reference values for the density histogram and performing a range correction on the character document corresponding to the first reference values; and means for, while the detecting means detects the type of the image as a photograph document, performing the range correction on the photograph document with a second reference value, irrespective of the density histogram.

2. An image forming apparatus according to claim 1, further comprising:

means for controlling the first reference value so that a difference between the first reference value and the second reference value is within a specific range.

3. An image forming apparatus according to claim 1, further comprising:

means for, while a detection result of the detecting means changes from the character document to the photograph document, setting a temporary reference value for a predetermined period.

4. An image forming apparatus according to claim 3, further comprising:

means for, while the detection result of the detecting means changes from the character document to the photograph document, performing the range correction on the photograph document with the second reference value as the temporary reference value for the predetermined period.

5. An image forming apparatus according to claim 4, further comprising:

means for, after the predetermined period the range correction has been done with the second reference value and while the detecting means detects the character document, performing the range correction on the character document with the first reference value.

6. An image forming apparatus according to claim 4, further comprising:

means for, after the predetermined period the range correction has been done with the second reference value and while the detecting means detects the photograph document, performing the range correction on the photograph document with the second reference value.

7. An image forming apparatus according to claim 1, further comprising:

means for, while a detection result of the detecting means changes from the photograph document to the character document, setting a temporary reference value for a predetermined period.

8. An image forming apparatus according to claim 7, further comprising:

means for, while a detection result of the detecting means changes from the photograph document to the character document, performing the range correction on the character document with the first reference value as the temporary reference value for the predetermined period.

9. An image forming apparatus according to claim 8, further comprising:

means for, after the predetermined period the range correction has been done with the first reference value and while the detecting means detects the photograph document, performing the range correction on the photograph document with the second reference value.

* * * * *